US009176760B2

(12) United States Patent
Halambi et al.

(10) Patent No.: US 9,176,760 B2
(45) Date of Patent: Nov. 3, 2015

(54) FAST, COMBINED FORWARDS-BACKWARDS PASS GLOBAL OPTIMIZATION FRAMEWORK FOR DYNAMIC COMPILERS

(71) Applicant: QUALCOMM Incorporated, San Diego, CA (US)

(72) Inventors: Ashok Halambi, Sunnyvale, CA (US); Gregory M. Wright, Chapel Hill, NC (US); Christopher A. Vick, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 14/034,770

(22) Filed: Sep. 24, 2013

(65) Prior Publication Data

US 2015/0089484 A1    Mar. 26, 2015

(51) Int. Cl.
G06F 9/44    (2006.01)
G06F 9/455    (2006.01)
G06F 9/45    (2006.01)

(52) U.S. Cl.
CPC ............ *G06F 9/45516* (2013.01); *G06F 8/443* (2013.01)

(58) Field of Classification Search
CPC .............................. G06F 9/45516; G06F 8/443
USPC .......................................................... 717/157
See application file for complete search history.

(56) References Cited

U.S. PATENT DOCUMENTS 5,528,508 A * 6/1996 Russell et al. ................... 716/52
5,530,957 A * 6/1996 Koenig ................................. 1/1
5,572,642 A * 11/1996 Nasu .............................. 345/418

(Continued)

OTHER PUBLICATIONS

Grove R B., et al., "Gem Optimizing Compilers for Alpha AXP Systems", Proceedings of the Spring Computer Society International Conference. (COMPCON). San Francisco, Feb. 22-26, 1993; [Proceedings of the Spring Computer Society International Conference. (COMPCON)], Los Alamitos, IEEE Comp. Soc. Press, US, vol. Conf. 38, Feb. 22, 1993, pp. 465-473, XP000379081, ISBN: 978-9-7803-1294-4 paragraph [02. 3].

(Continued)

*Primary Examiner* — Don Wong
*Assistant Examiner* — Theodore Hebert
(74) *Attorney, Agent, or Firm* — The Marbury Law Group, PLLC

(57) ABSTRACT

The various aspects provide a dynamic compilation framework that includes a machine-independent optimization module operating on a computing device and methods for optimizing code with the machine-independent optimization module using a single, combined-forwards-backwards pass of the code. In the various aspects, the machine-independent optimization module may generate a graph of nodes from the IR, optimize nodes in the graph using forwards and backwards optimizations, and propagating the forwards and backwards optimizations to nodes in a bounded subgraph recognized or defined based on the position of the node currently being optimized. In the various aspects, the machine-independent optimization module may optimize the graph by performing forwards and/or backwards optimizations during a single pass through the graph, thereby achieving an effective degree of optimization and shorter overall compile times. Thus, the various aspects may provide a global optimization framework for dynamic compilers that is faster and more efficient than existing solutions.

60 Claims, 13 Drawing Sheets

(56) References Cited

U.S. PATENT DOCUMENTS

| | | | |
|---|---|---|---|
| 5,613,117 A * | 3/1997 | Davidson et al. | 717/144 |
| 5,701,489 A * | 12/1997 | Bates et al. | 717/157 |
| 6,292,938 B1 * | 9/2001 | Sarkar et al. | 717/138 |
| 6,487,716 B1 * | 11/2002 | Choi et al. | 717/159 |
| 7,120,906 B1 * | 10/2006 | Stephenson et al. | 717/158 |
| 7,543,284 B2 * | 6/2009 | Bolton et al. | 717/157 |
| 7,743,370 B1 * | 6/2010 | Krablin et al. | 717/156 |
| 8,250,555 B1 | 8/2012 | Lee et al. | |
| 8,266,609 B2 | 9/2012 | Harris | |
| 8,387,035 B2 * | 2/2013 | Martin | 717/159 |
| 2002/0095669 A1 * | 7/2002 | Archambault | 717/157 |
| 2008/0059439 A1 * | 3/2008 | Fan et al. | 707/4 |
| 2009/0281999 A1 * | 11/2009 | Sinha | 707/3 |
| 2011/0044197 A1 * | 2/2011 | Koren et al. | 370/252 |
| 2015/0089484 A1 * | 3/2015 | Halambi et al. | 717/148 |

OTHER PUBLICATIONS

International Search Report and Written Opinion—PCT/US2014/056155—ISA/EPO—Dec. 4, 2014.

Tanenbaum A S., et al., "Using Peephole Optimization on Intermediate Code", ACM Transactions on Programming Languages and Systems, New York, NY, US, vol. 4, No. 1, Jan. 1, 1982, pp. 21-36, XP002030361, DOI: 19.1145/357153.357155 the whole document.

T. Gross et al., Structured Dataflow Analysis for Arrays and its Use in an Optimizing Compiler, Software-Practice and Experience, vol. 20(2), pp. 133-155, School of Computer Science, Carnegie Mellon University, Feb. 1990.

Self-Growing Neural Networks, 2008, pp. 1-86.

* cited by examiner

FAST, COMBINED FORWARDS-BACKWARDS PASS GLOBAL OPTIMIZATION FRAMEWORK FOR DYNAMIC COMPILERS

BACKGROUND

Generally, the compilation of a software application program may be performed in two steps: the first step before distribution and the second step after distribution, such as at the time of execution. This two-part compilation allows the software application to be distributed as bytecode (e.g., Dalvik bytecode) so that an optimizer may optimize the code for the specific machine on which the code is to be executed. As an example, Dalvik is a process virtual machine (VM) on the Google™ Android operating system that converts Dalvik bytecode to ARM executable object code prior to execution. This system allows the software applications to be easily ported to any computing device having virtualization software (e.g., Dalvik) that supports the instruction set architecture used by the first compiler, regardless of the device's underlying hardware and operating system interface.

Currently, an off-line compiler may parse an entire software application program and generate an intermediate representation (IR) to represent the program structure. This IR typically carries extra information, such as annotations on the abstract syntax tree, which may be used at code generation time by a dynamic or just-in-time (JIT) compiler to analyze and optimize the program, such as by determining the parts of the program that will not be executed in the current environment and removing such code (i.e., identifying code that will never be executed because it is not reachable on any path from start to end of the program in the current implementation or activation circumstance).

In dynamic languages, such as JavaScript, the parsing and compilation occurs at run-time, just before program execution. Parsing is the process of analyzing a text to determine its grammatical structure with respect to a given formal grammar, and in the interpretation of programs, parsing includes reading in the source script and converting it into an intermediate representation based on the language semantics of the program language. For most dynamic and/or scripting languages, parsing generates a bytecode representation of the program that is fed into an interpreter, which may invoke a just-in-time compiler to generate machine code for selected portions of the code.

Thus, for both static and dynamic languages, a just-in-time (JIT) compiler may analyze and optimize the program to generate more-performant binary or machine code. Since such optimizations are performed at runtime, the compilation processing time becomes part of the overall program execution time.

Modern JIT compilers may implement any of a number of machine-independent, global compiler optimizations to generate the more-performant binary code. Such optimizations include Dead Code Elimination (DCE), Sparse Conditional Constant Propagation (SCCP), Algebraic Simplification (AS), and Global Value Numbering (GVN), each of which may be classified as being either a "forwards pass" optimization or a "backwards pass" optimization.

Many JIT compilers implement each of these optimizations as individual passes over the Internal Representation (IR) of the input program. Another approach is to combine these optimizations into a single framework and have an iterative (i.e., multiple forwards followed by backwards passes or vice versa) fixed-point solution.

However, current solutions are not suitable for use in constrained computing environments, such as in mobile devices, which have limited processing and/or battery resources. Iterative point solutions may also take so long to complete that the user's experience is adversely affected when the user attempts to launch an application. For example, while the iterative solution has been shown to produce highly optimized code, the iterative solution suffers from the drawback of potentially taking a large number of iterations over the IR. As such, this solution is not very appropriate for a JIT compiler in the mobile domain where speed of compilation (and responsiveness to an application) is very important.

SUMMARY

The various aspects provide a dynamic compilation framework that includes a machine-independent optimization module operating on a computing device and methods for optimizing code with the machine-independent optimization module using a single, combined-forwards-backwards pass of the code. In the various aspects, the machine-independent optimization module may generate a graph of nodes from the IR of code, optimize nodes in the graph using forwards and backwards optimizations, and propagating the forwards and backwards optimizations to nodes in a bounded subgraph recognized or defined based on the position of the node currently being optimized. In the various aspects, the machine-independent optimization module may optimize the graph by performing forwards and/or backwards optimizations during a single pass through the graph, thereby achieving an effective degree of optimization and shorter overall compile times. Thus, the various aspects may provide a global optimization framework for dynamic compilers that is faster and more efficient than existing solutions.

The machine-independent optimization module may begin by optimizing a start node in the graph and traversing the graph in a forwards manner, applying one or more forwards optimizations and/or backwards optimizations to each node that may benefit from such optimizations. In another aspect, for each visited node, the machine-independent optimization module may propagate applied forwards optimizations to the visited node's successors and applied backwards optimizations to the visited node's predecessors. The machine-independent optimization module may limit such propagations to nodes within a bounded subgraph that has been recognized or defined around the visited node.

In another aspect, the machine-independent optimization module may maintain a count of the total number of times each node in the graph has been visited (i.e., optimized). In such an aspect, the machine-independent optimization module may ensure that the nodes in the graph are visited no more than two times, thereby ensuring manageable optimization times. Thus, the machine-independent optimization module may continue the single-pass, forwards/backwards optimization process until all nodes in the graph are optimized, eliminated, or visited twice. By limiting the process to visiting/optimizing nodes no more than two times, the various aspects enable code optimization that is faster than existing iterative solutions (i.e., exhibiting shorter compile times) while providing code optimizations that are on par with current iterative optimization techniques.

The various aspects include a method of optimizing an intermediate representation of source code by generating a graph from the intermediate representation wherein the graph includes a plurality of nodes, selecting a node in the graph, applying an optimization to the selected node, recognizing a bounded subgraph based on the selected node, and propagating the optimization to nodes in the bounded subgraph. In an aspect, recognizing a bounded subgraph based on the selected node may include identifying an entry node, wherein the entry node is a predecessor node of the selected node, scanning through the graph, determining whether an exit node is detected wherein an exit node is a successor node of the selected node, and defining the bounded subgraph based on the entry node and the exit node in response to determining that an exit node is detected. In another aspect, the method may also include determining whether there is an unvisited node in the graph and selecting an unvisited node for optimization in response to determining that there is an unvisited node in the graph.

In an aspect, selecting a node in the graph may include initializing a ready list, adding a start node to the ready list, selecting a node in the ready list, and incrementing a visitation counter of the selected node. In another aspect, selecting a node in the ready list may include determining whether there is a control flow node in the ready list, selecting the control flow node in response to determining that a control flow node is in the ready list, and selecting a data node in response to determining that there are no control flow nodes in the ready list. In another aspect, selecting a node in the ready list may include sorting nodes in the ready list into a reverse postordering and selecting a first node in the reverse postordering.

In an aspect, the method may also include adding successors of the selected node to the ready list and removing the selected node from the ready list. In another aspect, adding successors of the selected node to the ready list may include, for each of the selected node's successors, determining whether predecessors of a successor node have all been visited and adding the successor node to the ready list in response to determining that the successor node's predecessors have all been visited.

In an aspect, applying an optimization to the selected node may include determining whether the selected node has been visited more than twice. In another aspect, the method may also include determining whether to apply a forwards optimization on the selected node in response to determining that the selected node has not been visited more than twice, applying the forwards optimization on the selected node in response to determining to apply the forwards optimization on the selected node, determining whether to apply a backwards optimization on the selected node in response to determining that the selected node has not been visited more than twice, and applying the backwards optimization on the selected node in response to determining to apply the backwards optimization. In another aspect, propagating the optimization to nodes in the bounded subgraph may include propagating the forwards optimization through the bounded subgraph of the selected node in response to determining to apply the forwards optimization on the selected node and propagating the backwards optimization through the bounded subgraph of the selected node in response to determining to apply the backwards optimization on the selected node.

In another aspect, propagating the forwards optimization through the bounded subgraph of the selected node may include initializing a successor list, adding all successors of the selected node to the successor list, choosing a successor node from the successor list, incrementing a visitation counter of the chosen successor node, determining whether the chosen successor node has been visited more than twice, determining whether to apply the forwards optimization on the chosen successor node in response to determining that the chosen successor node has not been visited twice, applying the forwards optimization on the chosen successor node in response to determining to apply the forwards optimization, determining whether the chosen successor node is an exit node, adding successors of the chosen successor node to the successor list unless it is determined that the chosen successor node is an exit node or it is determined not to apply the forwards optimization on the chosen successor node, and removing the chosen successor node from the successor list. In another aspect, the method may also include determining whether the successor list is empty and selecting another successor node in the successor list in response to determining that the successor list is not empty.

In an aspect, propagating the backwards optimization through the bounded subgraph of the selected node may include initializing a predecessor list, adding all predecessors of the selected node to the predecessor list, choosing a predecessor node from the predecessor list, incrementing a visitation counter of the chosen predecessor node, determining whether the chosen predecessor node has been visited more than twice, determining whether to apply the backwards optimization on the chosen predecessor node in response to determining that the chosen predecessor node has not been visited twice, applying the backwards optimization on the chosen predecessor node in response to determining to apply the backwards optimization, determining whether the chosen predecessor node is an entry node, adding a predecessor of the chosen predecessor node to the predecessor list unless it is determined that the chosen predecessor node is an entry node or it is determined not to apply the backwards optimization on the chosen predecessor node, and removing the chosen predecessor node from the predecessor list. In another aspect, the method may also include determining whether the predecessor list is empty and selecting another predecessor node in the predecessor list in response to determining that the predecessor list is not empty.

In an aspect, the method may also include determining whether the ready list is empty and selecting another node in the ready list for optimization in response to determining that the ready list is not empty. In another aspect, the method may include determining whether all nodes in the graph have been visited in response to determining that the ready list is empty and adding an unvisited node to the ready list in response to determining that all nodes in the graph have not been visited. In yet another aspect, adding an unvisited node to the ready list may include scanning the graph for unvisited nodes, determining whether a phi node in the graph has not been visited, selecting the phi node in response to determining that the phi node has not been visited, selecting another unvisited node in response to determining that there are no unvisited phi nodes, and adding the selected node to the ready list. In another aspect, adding an unvisited node to the ready list may include scanning the graph for unvisited nodes, sorting the unvisited nodes into a reverse postordering, selecting a first node in the reverse postordering, and adding the selected node to the ready list.

Further aspects include a computing device that may include a memory and a processor coupled to the memory, wherein the processor may be configured with processor-executable instructions to perform operations that include generating a graph from an intermediate representation of source code, wherein the graph includes a plurality of nodes, selecting a node in the graph, applying an optimization to the selected node, recognizing a bounded subgraph based on the selected node, and propagating the optimization to nodes in the bounded subgraph. In another aspect, the processor may be configured with processor-executable instructions to perform operations such that recognizing a bounded subgraph based on the selected node includes identifying an entry node, wherein the entry node is a predecessor node of the selected node, scanning through the graph, determining whether an exit node is detected, wherein an exit node is a successor node of the selected node, and defining the bounded subgraph based on the entry node and the exit node in response to determining that an exit node is detected. In another aspect, the processor may be configured with processor-executable instructions to perform operations that include determining whether there is an unvisited node in the graph, and selecting an unvisited node for optimization in response to determining that there is an unvisited node in the graph.

In an aspect, the processor may be configured with processor-executable instructions to perform operations such that selecting a node in the graph includes initializing a ready list, adding a start node to the ready list, selecting a node in the ready list, and incrementing a visitation counter of the selected node. In another aspect the processor may be configured with processor-executable instructions to perform operations such that selecting a node in the ready list includes determining whether there is a control flow node in the ready list, selecting the control flow node in response to determining that a control flow node is in the ready list, and selecting a data node in response to determining that there are no control flow nodes in the ready list. In another aspect, the processor may be configured with processor-executable instructions to perform operations such that selecting a node in the ready list includes sorting nodes in the ready list into a reverse postordering and selecting a first node in the reverse postordering.

In an aspect, the processor may be configured with processor-executable instructions to perform operations that include adding successors of the selected node to the ready list and removing the selected node from the ready list. In another aspect, the processor may be configured with processor-executable instructions to perform operations such that adding successors of the selected node to the ready list includes, for each of the selected node's successors, determining whether predecessors of a successor node have all been visited and adding the successor node to the ready list in response to determining that the successor node's predecessors have all been visited.

In another aspect, the processor may be configured with processor-executable instructions to perform operations such that applying an optimization to the selected node includes determining whether the selected node has been visited more than twice. In a further aspect, the processor may be configured with processor-executable instructions to perform operations that include determining whether to apply a forwards optimization on the selected node in response to determining that the selected node has not been visited more than twice, applying the forwards optimization on the selected node in response to determining to apply the forwards optimization on the selected node, determining whether to apply a backwards optimization on the selected node in response to determining that the selected node has not been visited more than twice, and applying the backwards optimization on the selected node in response to determining to apply the backwards optimization.

In an aspect, the processor may be configured with processor-executable instructions to perform operations such that propagating the optimization to nodes in the bounded subgraph includes propagating the forwards optimization through the bounded subgraph of the selected node in response to determining to apply the forwards optimization on the selected node and propagating the backwards optimization through the bounded subgraph of the selected node in response to determining to apply the backwards optimization on the selected node. In another aspect, the processor may be configured with processor-executable instructions to perform operations such that propagating the forwards optimization through the bounded subgraph of the selected node includes initializing a successor list, adding all successors of the selected node to the successor list, choosing a successor node from the successor list, incrementing a visitation counter of the chosen successor node, determining whether the chosen successor node has been visited more than twice, determining whether to apply the forwards optimization on the chosen successor node in response to determining that the chosen successor node has not been visited twice, applying the forwards optimization on the chosen successor node in response to determining to apply the forwards optimization, determining whether the chosen successor node is an exit node, adding successors of the chosen successor node to the successor list unless it is determined that the chosen successor node is an exit node or it is determined not to apply the forwards optimization on the chosen successor node, and removing the chosen successor node from the successor list. In another aspect, the processor may be configured with processor-executable instructions to perform operations that include determining whether the successor list is empty, and selecting another successor node in the successor list in response to determining that the successor list is not empty.

In an aspect, the processor may be configured with processor-executable instructions to perform operations such that propagating the backwards optimization through the bounded subgraph of the selected node includes initializing a predecessor list, adding all predecessors of the selected node to the predecessor list, choosing a predecessor node from the predecessor list, incrementing a visitation counter of the chosen predecessor node, determining whether the chosen predecessor node has been visited more than twice, determining whether to apply the backwards optimization on the chosen predecessor node in response to determining that the chosen predecessor node has not been visited twice, applying the backwards optimization on the chosen predecessor node in response to determining to apply the backwards optimization, determining whether the chosen predecessor node is an entry node, adding a predecessor of the chosen predecessor node to the predecessor list unless it is determined that the chosen predecessor node is an entry node or it is determined not to apply the backwards optimization on the chosen predecessor node, and removing the chosen predecessor node from the predecessor list. In another aspect, the processor may be configured with processor-executable instructions to perform operations that include determining whether the predecessor list is empty, and selecting another predecessor node in the predecessor list in response to determining that the predecessor list is not empty.

In an aspect, the processor may be configured with processor-executable instructions to perform operations that include determining whether the ready list is empty and selecting another node in the ready list for optimization in response to determining that the ready list is not empty. In another aspect, the processor may be configured with processor-executable instructions to perform operations that include determining whether all nodes in the graph have been visited in response to determining that the ready list is empty and adding an unvisited node to the ready list in response to determining that all nodes in the graph have not been visited. In a further aspect, the processor may be configured with processor-executable instructions to perform operations such that adding an unvisited node to the ready list includes scanning the graph for unvisited nodes, determining whether a phi node in the graph has not been visited, selecting the phi node in response to determining that the phi node has not been visited, selecting another unvisited node in response to determining that there are no unvisited phi nodes, and adding the selected node to the ready list. In another aspect, the processor may be configured with processor-executable instructions to perform operations such that adding an unvisited node to the ready list includes scanning the graph for unvisited nodes, sorting the unvisited nodes into a reverse postordering, selecting a first node in the reverse postordering, and adding the selected node to the ready list.

Further aspects may include a computing device including means for generating a graph from an intermediate representation of source code wherein the graph includes a plurality of nodes, means for selecting a node in the graph, means for applying an optimization to the selected node means for recognizing a bounded subgraph based on the selected node, and means for propagating the optimization to nodes in the bounded subgraph. In another aspect, means for recognizing a bounded subgraph based on the selected node may include means for identifying an entry node, wherein the entry node is a predecessor node of the selected node, means for scanning through the graph, means for determining whether an exit node is detected, wherein an exit node is a successor node of the selected node, and means for defining the bounded subgraph based on the entry node and the exit node in response to determining that an exit node is detected. In another aspect, the computing device may include means for determining whether there is an unvisited node in the graph and means for selecting an unvisited node for optimization in response to determining that there is an unvisited node in the graph.

In an aspect, means for selecting a node in the graph may include means for initializing a ready list, means for adding a start node to the ready list, means for selecting a node in the ready list, and means for incrementing a visitation counter of the selected node. In another aspect, means for selecting a node in the ready list may include means for determining whether there is a control flow node in the ready list, means for selecting the control flow node in response to determining that a control flow node is in the ready list, and means for selecting a data node in response to determining that there are no control flow nodes in the ready list. In another aspect, means for selecting a node in the ready list may include means for sorting nodes in the ready list into a reverse postordering and means for selecting a first node in the reverse postordering.

In an aspect, the computing device may include means for adding successors of the selected node to the ready list and means for removing the selected node from the ready list. In another aspect, means for adding successors of the selected node to the ready list may include means for, for each of the selected node's successors, determining whether predecessors of a successor node have all been visited and means for adding the successor node to the ready list in response to determining that the successor node's predecessors have all been visited. In another aspect, means for applying an optimization to the selected node may include means for determining whether the selected node has been visited more than twice.

In an aspect, the computing device may include means for determining whether to apply a forwards optimization on the selected node in response to determining that the selected node has not been visited more than twice, means for applying the forwards optimization on the selected node in response to determining to apply the forwards optimization on the selected node, means for determining whether to apply a backwards optimization on the selected node in response to determining that the selected node has not been visited more than twice, and means for applying the backwards optimization on the selected node in response to determining to apply the backwards optimization. In another aspect, means for propagating the optimization to nodes in the bounded subgraph may include means for propagating the forwards optimization through the bounded subgraph of the selected node in response to determining to apply the forwards optimization on the selected node and means for propagating the backwards optimization through the bounded subgraph of the selected node in response to determining to apply the backwards optimization on the selected node.

In an aspect, means for propagating the forwards optimization through the bounded subgraph of the selected node may include means for initializing a successor list, means for adding all successors of the selected node to the successor list, means for choosing a successor node from the successor list, means for incrementing a visitation counter of the chosen successor node, means for determining whether the chosen successor node has been visited more than twice, means for determining whether to apply the forwards optimization on the chosen successor node in response to determining that the chosen successor node has not been visited twice, means for applying the forwards optimization on the chosen successor node in response to determining to apply the forwards optimization, means for determining whether the chosen successor node is an exit node, means for adding successors of the chosen successor node to the successor list unless it is determined that the chosen successor node is an exit node or it is determined not to apply the forwards optimization on the chosen successor node, and means for removing the chosen successor node from the successor list. In another aspect, the computing device may include means for determining whether the successor list is empty and means for selecting another successor node in the successor list in response to determining that the successor list is not empty.

In an aspect, means for propagating the backwards optimization through the bounded subgraph of the selected node may include means for initializing a predecessor list, means for adding all predecessors of the selected node to the predecessor list, means for choosing a predecessor node from the predecessor list, means for incrementing a visitation counter of the chosen predecessor node, means for determining whether the chosen predecessor node has been visited more than twice, means for determining whether to apply the backwards optimization on the chosen predecessor node in response to determining that the chosen predecessor node has not been visited twice, means for applying the backwards optimization on the chosen predecessor node in response to determining to apply the backwards optimization, means for determining whether the chosen predecessor node is an entry node, means for adding a predecessor of the chosen predecessor node to the predecessor list unless it is determined that the chosen predecessor node is an entry node or it is determined not to apply the backwards optimization on the chosen predecessor node, and means for removing the chosen predecessor node from the predecessor list. In another aspect, the computing device may include means for determining whether the predecessor list is empty, and means for selecting another predecessor node in the predecessor list in response to determining that the predecessor list is not empty.

In an aspect, the computing device may include means for determining whether the ready list is empty and means for selecting another node in the ready list for optimization in response to determining that the ready list is not empty. In another aspect, the computing device may include means for determining whether all nodes in the graph have been visited in response to determining that the ready list is empty and means for adding an unvisited node to the ready list in response to determining that all nodes in the graph have not been visited. In yet another aspect, means for adding an unvisited node to the ready list may include means for scanning the graph for unvisited nodes, means for determining whether a phi node in the graph has not been visited, means for selecting the phi node in response to determining that the phi node has not been visited, means for selecting another unvisited node in response to determining that there are no unvisited phi nodes, and means for adding the selected node to the ready list. In another aspect, means for adding an unvisited node to the ready list may include means for scanning the graph for unvisited nodes, means for sorting the unvisited nodes into a reverse postordering, means for selecting a first node in the reverse postordering, and means for adding the selected node to the ready list.

In further aspects, a non-transitory processor-readable storage medium may have stored thereon processor-executable software instructions configured to cause a processor to perform operations for optimizing an intermediate representation of source code, the operations including generating a graph from the intermediate representation wherein the graph includes a plurality of nodes, selecting a node in the graph, applying an optimization to the selected node, recognizing a bounded subgraph based on the selected node, and propagating the optimization to nodes in the bounded subgraph. In another aspect, the stored processor-executable software instructions may be configured to cause a processor of a computing device to perform operations such that recognizing a bounded subgraph based on the selected node includes identifying an entry node, wherein the entry node is a predecessor node of the selected node, scanning through the graph, determining whether an exit node is detected, wherein an exit node is a successor node of the selected node, and defining the bounded subgraph based on the entry node and the exit node in response to determining that an exit node is detected. In another aspect, the stored processor-executable software instructions may be configured to cause a processor of a computing device to perform operations that include determining whether there is an unvisited node in the graph and selecting an unvisited node for optimization in response to determining that there is an unvisited node in the graph.

In an aspect, the stored processor-executable software instructions may be configured to cause a processor of a computing device to perform operations such that selecting a node in the graph includes initializing a ready list, adding a start node to the ready list, selecting a node in the ready list, and incrementing a visitation counter of the selected node. In another aspect, the stored processor-executable software instructions may be configured to cause a processor of a computing device to perform operations such that selecting a node in the ready list includes determining whether there is a control flow node in the ready list, selecting the control flow node in response to determining that a control flow node is in the ready list, and selecting a data node in response to determining that there are no control flow nodes in the ready list. In another aspect, the stored processor-executable software instructions may be configured to cause a processor of a computing device to perform operations such that selecting a node in the ready list includes sorting nodes in the ready list into a reverse postordering, and selecting a first node in the reverse postordering.

In an aspect, the stored processor-executable software instructions may be configured to cause a processor of a computing device to perform operations that include adding successors of the selected node to the ready list, and removing the selected node from the ready list. In another aspect, the stored processor-executable software instructions may be configured to cause a processor of a computing device to perform operations such that adding successors of the selected node to the ready list includes, for each of the selected node's successors, determining whether predecessors of a successor node have all been visited, and adding the successor node to the ready list in response to determining that the successor node's predecessors have all been visited.

In an aspect, the stored processor-executable software instructions may be configured to cause a processor of a computing device to perform operations such that applying an optimization to the selected node includes determining whether the selected node has been visited more than twice. In another aspect, the stored processor-executable software instructions may be configured to cause a processor of a computing device to perform operations that include determining whether to apply a forwards optimization on the selected node in response to determining that the selected node has not been visited more than twice, applying the forwards optimization on the selected node in response to determining to apply the forwards optimization on the selected node, determining whether to apply a backwards optimization on the selected node in response to determining that the selected node has not been visited more than twice, and applying the backwards optimization on the selected node in response to determining to apply the backwards optimization. In another aspect, the stored processor-executable software instructions may be configured to cause a processor of a computing device to perform operations such that propagating the optimization to nodes in the bounded subgraph includes propagating the forwards optimization through the bounded subgraph of the selected node in response to determining to apply the forwards optimization on the selected node, and propagating the backwards optimization through the bounded subgraph of the selected node in response to determining to apply the backwards optimization on the selected node.

In an aspect, the stored processor-executable software instructions may be configured to cause a processor of a computing device to perform operations such that propagating the forwards optimization through the bounded subgraph of the selected node includes initializing a successor list, adding all successors of the selected node to the successor list, choosing a successor node from the successor list, incrementing a visitation counter of the chosen successor node, determining whether the chosen successor node has been visited more than twice, determining whether to apply the forwards optimization on the chosen successor node in response to determining that the chosen successor node has not been visited twice, applying the forwards optimization on the chosen successor node in response to determining to apply the forwards optimization, determining whether the chosen successor node is an exit node, adding successors of the chosen successor node to the successor list unless it is determined that the chosen successor node is an exit node or it is determined not to apply the forwards optimization on the chosen successor node, and removing the chosen successor node from the successor list. In another aspect, the stored processor-executable software instructions may be configured to cause a processor of a computing device to perform operations that include determining whether the successor list is empty, and selecting another successor node in the successor list in response to determining that the successor list is not empty.

In an aspect, the stored processor-executable software instructions may be configured to cause a processor of a computing device to perform operations such that propagating the backwards optimization through the bounded subgraph of the selected node includes initializing a predecessor list, adding all predecessors of the selected node to the predecessor list, choosing a predecessor node from the predecessor list, incrementing a visitation counter of the chosen predecessor node, determining whether the chosen predecessor node has been visited more than twice, determining whether to apply the backwards optimization on the chosen predecessor node in response to determining that the chosen predecessor node has not been visited twice, applying the backwards optimization on the chosen predecessor node in response to determining to apply the backwards optimization, determining whether the chosen predecessor node is an entry node, adding a predecessor of the chosen predecessor node to the predecessor list unless it is determined that the chosen predecessor node is an entry node or it is determined not to apply the backwards optimization on the chosen predecessor node, and removing the chosen predecessor node from the predecessor list. In another aspect, the stored processor-executable software instructions may be configured to cause a processor of a computing device to perform operations that include determining whether the predecessor list is empty, and selecting another predecessor node in the predecessor list in response to determining that the predecessor list is not empty.

In an aspect, the stored processor-executable software instructions may be configured to cause a processor of a computing device to perform operations that include determining whether the ready list is empty, and selecting another node in the ready list for optimization in response to determining that the ready list is not empty. In another aspect, the stored processor-executable software instructions may be configured to cause a processor of a computing device to perform operations that include determining whether all nodes in the graph have been visited in response to determining that the ready list is empty, and adding an unvisited node to the ready list in response to determining that all nodes in the graph have not been visited. In another aspect, the stored processor-executable software instructions may be configured to cause a processor of a computing device to perform operations such that adding an unvisited node to the ready list includes scanning the graph for unvisited nodes, determining whether a phi node in the graph has not been visited, selecting the phi node in response to determining that the phi node has not been visited, selecting another unvisited node in response to determining that there are no unvisited phi nodes, and adding the selected node to the ready list. In yet another aspect, the stored processor-executable software instructions may be configured to cause a processor of a computing device to perform operations such that adding an unvisited node to the ready list includes scanning the graph for unvisited nodes, sorting the unvisited nodes into a reverse postordering, selecting a first node in the reverse postordering, and adding the selected node to the ready list.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
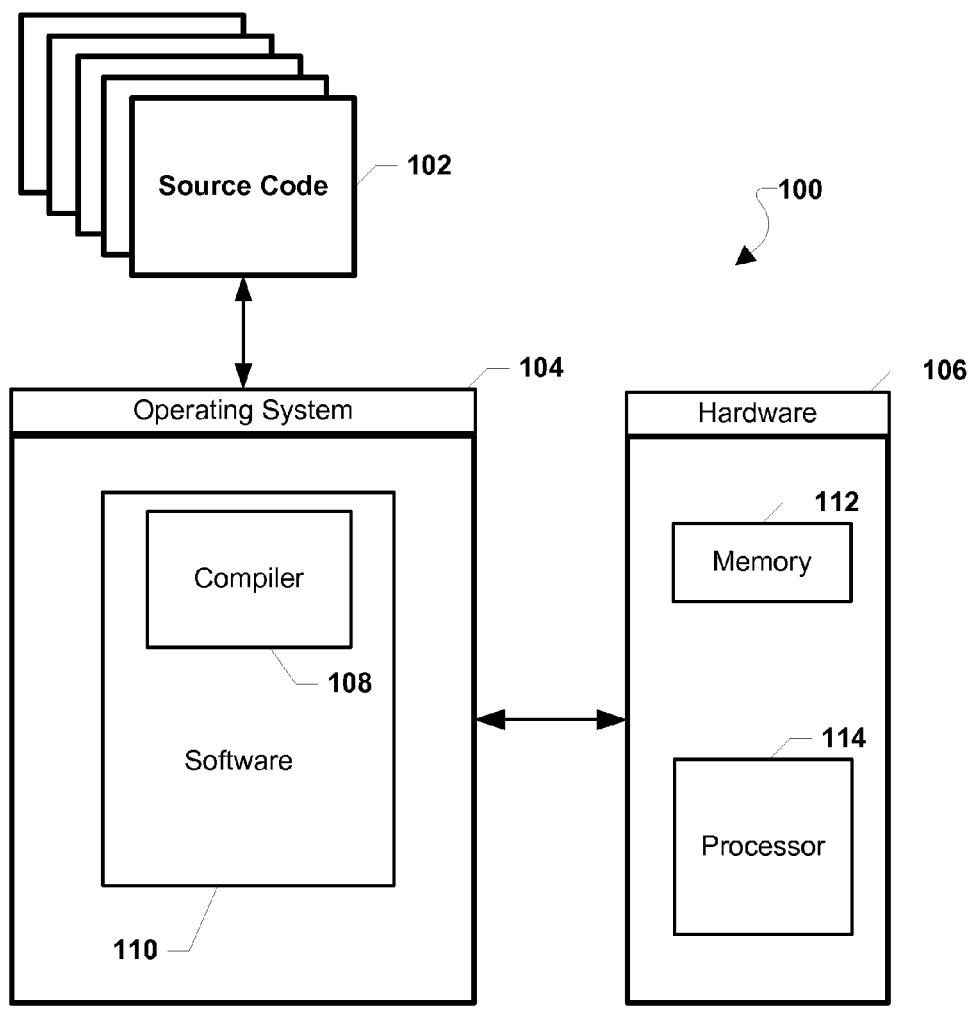
FIG. 1 is a system block diagram of a typical computing device suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used herein to refer to any one or all of personal computers, servers, desktop computers, cellular telephones, smartphones, personal or mobile multimedia players, personal data assistants (PDA's), laptop computers, tablet computers, smartbooks, palm-top computers, wireless electronic mail receivers, multimedia Internet enabled cellular telephones, wireless gaming controllers, and similar electronic devices that include a programmable processor and a memory. While the various aspects are particularly useful in mobile computing devices, such as cellular telephones, which have limited processing power and battery capacity, the aspects are generally useful in any computing device that may benefit from reduced compile times and reduced energy consumption.

As discussed above, current techniques for optimizing code include performing multiple, iterative passes over an intermediate representation (IR) of the code to perform forwards and backwards optimizations. These techniques produce highly optimized code at the cost of increased compile time and shorter battery life. While the costs of performing contemporary optimization techniques may not greatly affect performance on computing devices that have higher processing power and/or are not reliant on a battery (e.g., personal computers, desktops, servers, etc.), users of mobile computing devices that implement current optimization techniques may experience noticeably longer application load times and shorter battery life. Thus, users may benefit from an optimization strategy that minimizes the time and battery power investment of performing code optimization while maximizing the benefits of code optimization.

In overview, the various aspects provide a dynamic compilation framework that includes a machine-independent optimization module (e.g., a machine-independent optimizer implemented in software) operating on a computing device and methods for optimizing code with the machine-independent optimization module using a single, combined-forwards-backwards pass of the code. In the various aspects, the machine-independent optimization module may generate a graph of nodes (e.g., a directed, acyclic or cyclic graph) from the IR, optimize nodes in the graph using forwards and backwards optimizations, and propagating the forwards and backwards optimizations to nodes in a bounded subgraph recognized or defined based on the position of the node currently being optimized. In the various aspects, the machine-independent optimization module may optimize the graph by performing forwards and/or backwards optimizations during a single pass through the graph, thereby achieving an effective degree of optimization and shorter overall compile times. Thus, the various aspects may provide a global optimization framework for dynamic compilers that is faster and more efficient than existing solutions.

In an aspect, the machine-independent optimization module may optimize the IR without knowing the characteristics of the final device on which the application program is deployed, and thus may perform the various aspects as part of either the first or second stage of the two-part compilation process.

In an aspect, the machine-independent optimization module may optimize a graph by performing a combination of forwards and backwards optimizations in a single pass of the graph. The machine-independent optimization module may begin by optimizing a start node in the graph and traversing the graph in a forwards manner, applying one or more forwards optimizations (e.g., sparse conditional constant propagation, global value numbering, etc.) and/or backwards optimizations to each node that may benefit from such optimizations. In another aspect, the machine-independent optimization module may utilize a "ready-to-optimize" list (i.e., a "ready list"), whereby the machine-independent optimization module may visit a node in the list (e.g., the start node), perform applicable forwards and/or backwards optimizations on the visited node, add the visited node's successors to the ready list, remove the visited node from the ready list, and repeat the process until the ready list is empty.

In another aspect, for each visited node, the machine-independent optimization module may propagate applied forwards optimizations to the visited node's successors and applied backwards optimizations to the visited node's predecessors. The machine-independent optimization module may limit such propagations to nodes within a bounded subgraph around the visited node. For instance, the machine-independent optimization module may propagate a backwards optimization to the visited node's predecessors until the machine-independent optimization module reaches an entry node (i.e., a "stopping" point in the beginning of a bounded subgraph, such as a merge point or phi node). For example, the machine-independent optimization module may visit a node and perform a dead code elimination (DCE) operation to remove that node from the graph, move back up the bounded subgraph to that node's predecessor(s), determine whether the predecessor node(s) have any uses other than feeding information to the now-eliminated node, and if not, remove the predecessor node(s) from the graph. Similarly, in another aspect, the machine-independent optimization module may also propagate a forwards optimization to the visited node's successor nodes until the machine-independent optimization module reaches an exit node (i.e., a "stopping" point at the end of the bounded subgraph).

The machine-independent optimization module may recognize the boundaries of a bounded subgraph in several ways. In an aspect, the machine-independent optimization module may dynamically (i.e., on the fly) recognize the boundaries of the subgraph during propagation of forwards and/or backwards optimizations. For example, the machine-independent optimization module may continue propagating forwards and/or backwards propagations until the machine-independent optimization module recognizes an entry or exit node (i.e., nodes representing the boundary of the bounded subgraph). Thus, in such an aspect, the machine-independent optimization module may naturally recognize the boundaries of a visited node's subgraph as a consequence of propagating the optimizations and not as a result of scanning through the graph beforehand.

In another aspect, the machine-independent optimization module may define or otherwise predetermine the boundaries of a bounded subgraph before propagating optimizations by scanning through the graph and determining one or more entry nodes and one or more exit nodes that serve as natural start and end points for a particular visited node. For example, the machine-independent optimization module may select a group of nodes that corresponds to a loop in the IR (e.g., a "for loop" or a "do-while" loop) to be a bounded subgraph. In a further aspect, the nodes comprising a bounded subgraph may be organized into a graph or tree structure so that the relationships between the nodes in the bounded subgraph (including the visited node) are clearly defined and so that the bounded subgraph has at least one defined starting point and at least one defined ending point.

In another aspect, the machine-independent optimization module may limit propagation of forwards and/or backwards optimizations to nodes included in a bounded subgraph to reduce or control the amount of information stored in the cache or memory as part of the optimization process. In a further aspect, by controlling the amount of information stored in the cache, the machine-independent optimization module may apply either a forward optimization or a backward optimization or both in a single pass without substantial memory allocation or information storage overhead.

In another aspect, the machine-independent optimization module may maintain a count of the total number of times each node in the graph has been visited (i.e., optimized). For example, the machine-independent optimization module may record that a node was visited once to receive a forwards optimization and was visited a second time during the propagation of a backwards optimization. In such an aspect, the machine-independent optimization module may ensure that the nodes in the graph are visited no more than two times. For example, a propagation of a backwards optimization to a visited node's predecessors may cause the machine-independent optimization module to revisit a prior node. In that event, the machine-independent optimization module may apply the backwards optimization to that node only if the node has not already been visited twice.

In the various aspects, the single-pass, forwards/backwards optimization process may continue until all nodes in the graph are optimized, eliminated, or visited twice. By limiting the process to visiting/optimizing nodes no more than two times, the various aspects enable code optimization that is faster than existing iterative solutions (i.e., exhibiting shorter compile times) while providing code optimizations that are on par with current iterative optimization techniques.

In further aspects, the machine-independent optimization module may implement various strategies for selecting the next node to process from the ready list. For example, the machine-independent optimization module may visit control-flow nodes in the ready list before visiting data nodes. In another example, the machine-independent optimization module may visit nodes in the ready list in reverse postorder.

In another aspect, the machine-independent optimization module may add nodes that have not yet been visited (i.e., "unvisited" nodes) to the ready list when the ready list becomes empty. For example, the machine-independent optimization module may add a node to the ready list that is unreachable from a start node. In a further aspect, the machine-independent optimization module may opt to add unvisited phi nodes to the ready list first, followed by other types of unvisited nodes. In another aspect, the machine-independent optimization module may add unvisited nodes to the ready list based on a reverse postordering.

The various aspects may be implemented within a variety of computing devices 100, an example block diagram of which is illustrated in FIG. 1. A computing device 100 may include an operating system 104, which may be a high-level operating system used to manage and execute various software 110 on the computing device 100. The operating system 104 may also enable various software 110 to access hardware resources 106, such as memory 112 and a processor 114. The operating system 104 may host a compiler 108, which may be or may include a machine-independent optimization module for optimizing intermediate representations of code. In another aspect, the compiler may be a module within a larger system.

The compiler may be one or more software programs that transforms source code 102 written in one programming language (i.e., the source language) into another programming language (i.e., the target language). In an example, the source code 102 may be a collection of computer instructions typically written using a human-readable programming language, such as Java®, C++, Perl®, Python®, etc., and the compiler 108 may transform the source code 102 into an executable program. The source code 102 may exist as one or more files or in a database and may be stored on various types of storage media (not shown), such as optical disks or hard-drive disks.

The compiler 108 may access the hardware resources 106 through the operating system 104 to facilitate compiling the source code 102 into a more useful form. For example, the compiler 108 may have access to the memory 112 (e.g., RAM) and various registers (not shown) and may utilize the processing capabilities of the processor 114.

Figure 2:
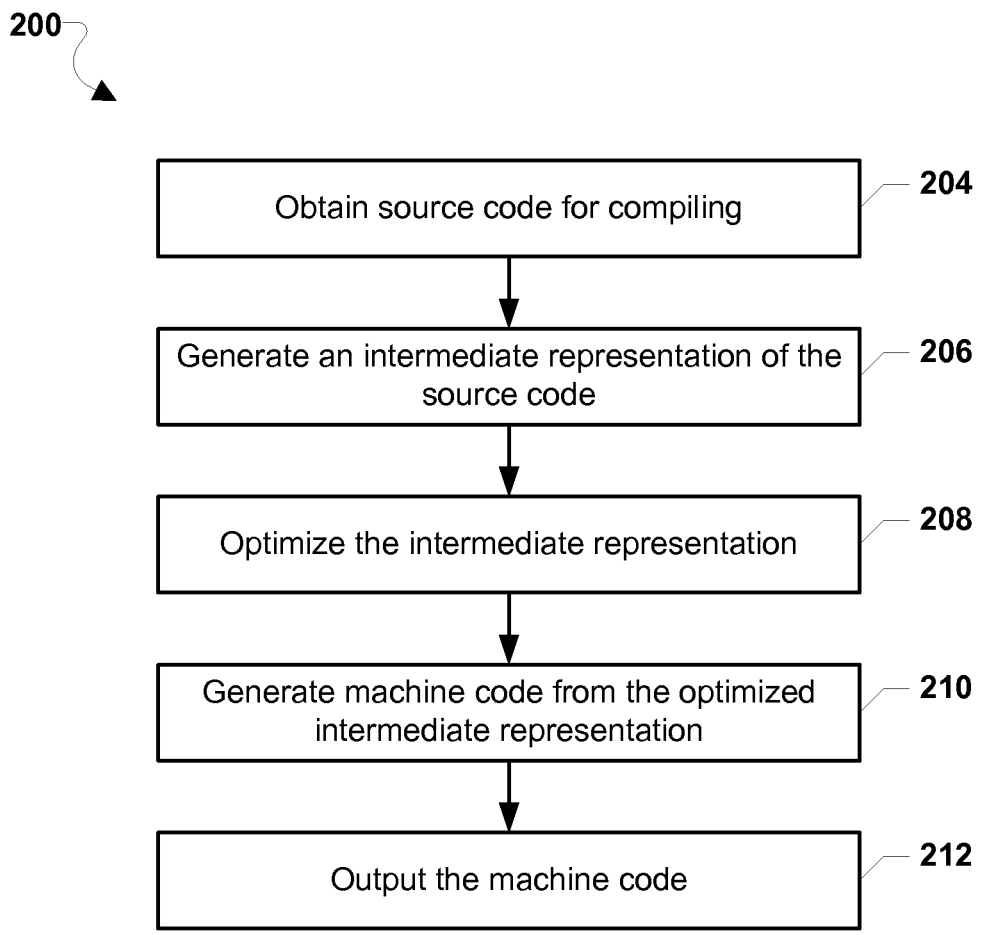
FIG. 2 is a process flow diagram illustrating a typical method for compiling source code.

FIG. 2 illustrates a typical method 200 that may be implemented in a compiler for compiling source code into executable code. In block 204, the compiler may obtain source code for compiling. For example, the compiler may access source code stored on a hard drive included on the computing device. The compiler may also generate an intermediate representation of the source code in block 206. For example, the compiler may perform various operations to prepare the source code for optimization, such as by checking the code for proper syntax and semantics, parsing the source code, and building a corresponding parse tree and symbol table.

In block 208, the compiler may optimize the intermediate representation. The compiler may implement various optimization strategies. For example, the compiler may remove useless or unreachable code, discover and propagate constant values, relocate computation to a less frequently executed place (e.g., moving an operation/instruction out of a loop), or specializing a computation based on the context.

The compiler may also generate executable code from the optimized intermediate representation in block 210. For example, the compiler may convert the optimized intermediate representation to machine code that may be executed by a processor on the computing device. The compiler may also output the executable code in block 212. For example, the compiler may output the executable code in the form of an executable application or program.

Figure 3:
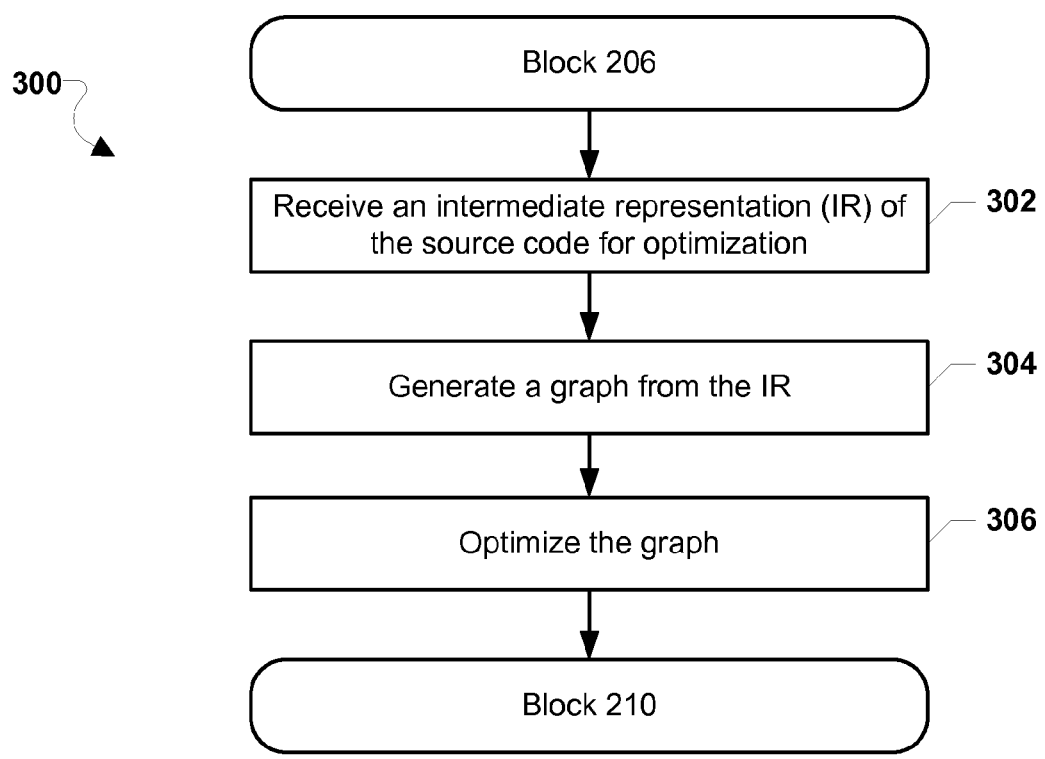
FIG. 3 is a process flow diagram illustrating a typical method for optimizing a graph generated from an intermediate representation of source code.

FIG. 3 illustrates a typical method 300 implemented by a typical machine-independent optimization module for optimizing a graph generated from an intermediate representation of source code. The method 300 implements operations of block 208 of method 200 described above with reference to FIG. 2. The machine-independent optimization module may start performing method 300 after a compiler or another component generates an intermediate representation of the source code in block 206 of method 200 as described above with reference to FIG. 2.

In block 302, the machine-independent optimization module may typically receive an intermediate representation (IR) of the source code for optimization. In block 304, the machine-independent optimization module may generate a graph from the IR. The graph may include a plurality of nodes that correspond to the IR of the source code, and the machine-independent optimization module may construct the graph using known methods.

In block 306, the machine-independent optimization module may optimize the graph. In current implementations, a machine-independent optimization module may start applying forwards optimizations beginning at the first node in the graph and will continue traversing the graph until the machine-independent optimization module reaches the end of the graph. The machine-independent optimization module will then typically start applying backwards optimizations from the end of the graph through predecessor nodes until the machine-independent optimization module reaches the beginning of the graph. Current methods may configure the machine-independent optimization module to continue applying forwards and backwards passes, optimizing the code iteratively until some process-ending threshold is met indicating that the results of another iteration would be minimal. While applying multiple, iterative passes yields highly optimized code, such iterative methods increase compile time and require considerably more power, which may impact the battery life of many mobile device.

Typically after optimizing the graph, the machine-independent optimization module may generate machine code from the optimized intermediate representation in block 210 of method 200 described with reference to FIG. 2.

Figure 4:
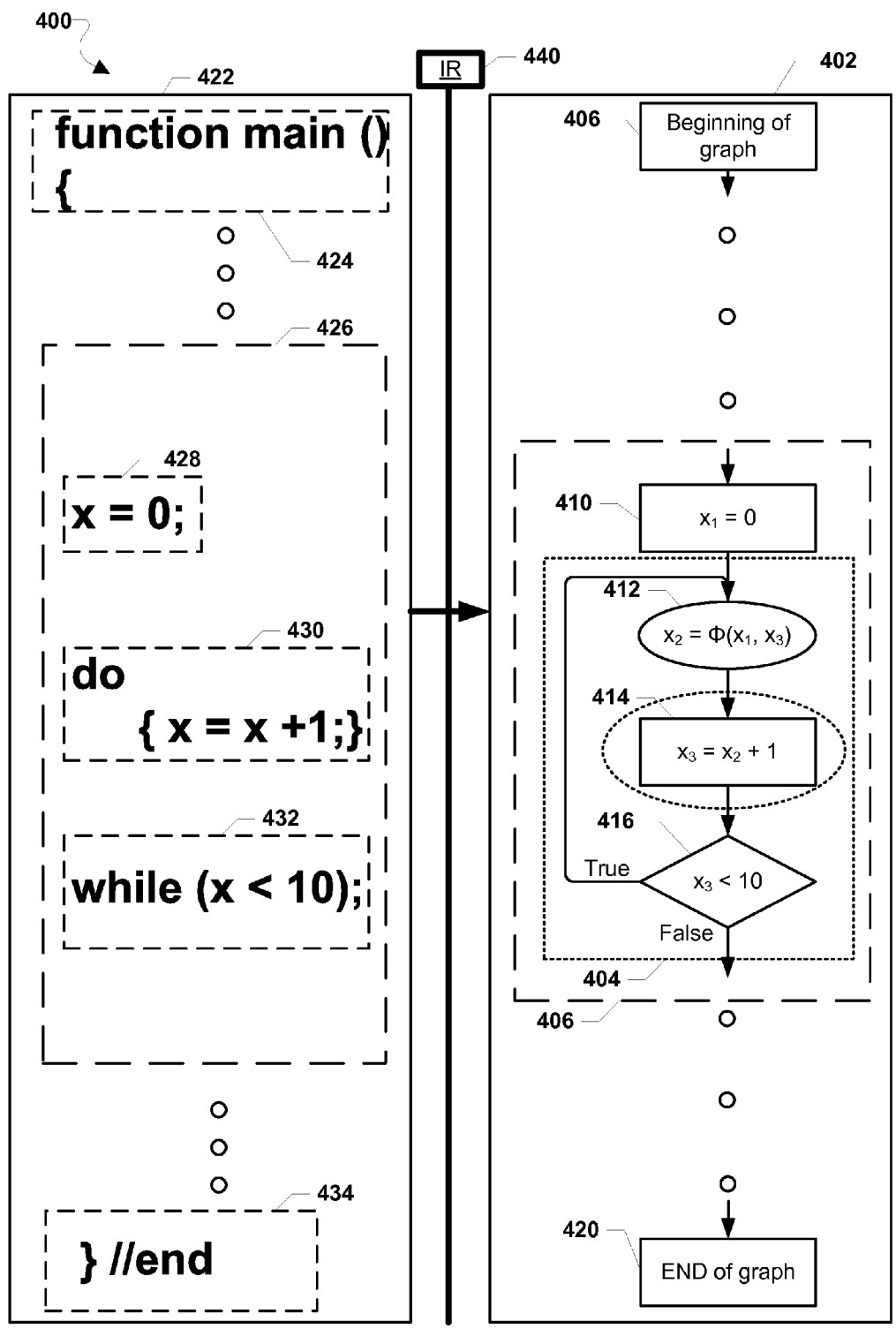
FIG. 4 is an illustration of a segment of code represented as a control flow graph.

FIG. 4 illustrates example source code and a graph generated from an IR of the source code. In the example, the source code 422 (illustrated in FIG. 4 as a high-level, human-readable pseudo code) includes various operations, including a set of instructions for performing a do-while looping operation (i.e., the code segment 426). In such an example, the code segment 426 may set a variable "x" to zero in an assignment operation 428 (i.e., "x=0;"). The code segment 426 may also include instructions that increment the value of the variable (i.e., the "do instruction" 430) and perform a check to determine whether the value of the variable is greater than ten (i.e., the "while instruction" 432). These operations may continue in a loop, such that the variable's value may continue to be incremented until the variable's value is equal to ten.

As discussed above with reference to FIG. 3, a compiler operating on the computing device may produce an IR 440 of the source code 422, and the machine-independent optimization module may generate a graph 402 from the IR 440. For example, the first node in the graph 402 (i.e., node 406) may correspond to the IR of the beginning of the source code 424, and the last node in the graph 402 (i.e., node 420) may correspond to the IR of the end of the source code 434. In an aspect, there may be one or more intermediary nodes of varying types in between node 406 and node 420, and these intermediary nodes may represent the various operations included in the IR 440 of the source code 422.

In an aspect, the machine-independent optimization module may generate the graph 402 in static single assignment ("SSA") form, which requires each variable to be assigned exactly once such that each definition of a variable has its own variable or "definition." For example, the statement "x=x+1" may be represented as "$x_2=x_1+1$," wherein each version of "x" is treated as a separate variable. In another aspect, the nodes in the graph may include representations of one or more operations in the IR 440.

In the example illustrated in FIG. 4, a portion of the graph 404 may correspond to the IR of the code segment 426. In this example, the portion of the graph 404 may include various nodes related to the do-while loop structure in the code segment 426. For instance, the portion of the graph 404 may begin at data node 410, which may be reachable from a prior node in the graph 402.

At data node 410, a data operation may be performed (i.e., the SSA variable "$x_1$" is assigned a value of zero). The operational flow may flow to phi node 412. In an aspect, because putting an IR into SSA form may create multiple versions of a single variable, phi nodes may function as a merge point in which one of multiple versions of a variable is selected for further computation. In phi node 412, a version of "x" may be selected based on the control flow (i.e., "$x_2=\Phi(x_1, x_3)$"). For example, "$x_1$" may be selected at phi node 412 when control has flowed from data node 410, but "$x_3$" may be selected when control flows from the control flow node 416.

The control may flow from phi node 412 to data node 414. In data node 414, the "$x_3$" variable may be assigned the sum of "$x_2$" plus one, which may correspond to the do instruction 430 in the code segment 426. Operations may continue in control flow node 416, wherein the value of the variable "$x_3$" is checked. Control may flow to phi node 412 when "$x_3$" is less than 10, or control may continue to flow towards the end node 420 in the graph 402 when "$x_3$" is ten.

In various aspects, the machine-independent optimization module may optimize a graph through a single pass from a start node (e.g., start node 406) to an end node (e.g., end node 420) and may apply both forwards and backwards optimizations to the nodes (i.e., visited nodes) in the graph during the single pass. For example, after visiting data node 410 and applying forwards optimization, the machine-independent optimization module may visit phi node 412 (i.e., a successor of the data node 410) and determine whether the phi node 412 would benefit from forwards optimizations.

In another aspect, the machine-independent optimization module may apply forwards and/or backwards optimizations on nodes a maximum of two times. The process of applying optimizations during a the single pass of each graph is described in further detail with reference to FIGS. 5 and 7.

In further aspects, the machine-independent optimization module may propagate optimizations applied to a visited node to other nodes included in a bounded subgraph recognized or defined in relation to the visited node. A bounded subgraph may include one or more entry nodes (i.e., one or more starting points), one or more exit nodes (i.e., one or more stopping points), and one or more intermediary nodes. The nodes in the bounded subgraph may include the following node types: control flow nodes (e.g., representing loops and other constructs that determine what operations are to be performed next); data nodes (e.g., operations such as addition, subtraction, etc.); and "phi nodes," which are merge points in the code that identify a relationship between the different paths between the control flow nodes and the data nodes.

In an aspect, the machine-independent optimization module may dynamically (i.e., on the fly) recognize the boundaries of a bounded subgraph during propagation of optimizations to a visited node's successors and/or predecessors by traversing backwards from the visited node until one or more "entry" nodes (e.g., a phi node or another starting point) are detected and by traversing forwards from the visited node until one or more "exit" nodes (e.g., a phi node or another stopping point) are detected.

In another aspect, for each visited node, the machine-independent optimization module may break the graph 402 into a predetermined, defined bounded subgraph before propagating optimizations from the visited node. The process of breaking the graph into bounded subgraphs is described in further detail below with reference to FIG. 6.

In another aspect, the machine-independent optimization module may define or recognize bounded subgraphs around structures in the code that may have a clear start and end, such as loops, conditional statements, etc. Also, because bounded subgraphs are recognized or defined in relation to separate visited nodes, each visited node may have a different bounded subgraph associated with it.

Returning to FIG. 4, the machine-independent optimization module may visit the data node 414 and determine that the data node 414's bounded subgraph 404 starts at phi node 412 (i.e., an entry node) and stops at control flow node 416 (i.e., an exit node). After applying a backwards optimization to the data node 414, the machine-independent optimization module may begin propagating the backwards optimization to the data node 414's predecessors (e.g., phi node 412). The machine-independent optimization module may then determine whether the phi node 412 may benefit from a backwards optimization and apply the backwards optimization if applicable. The machine-independent optimization module may end the backwards traversal at this point because the machine-independent optimization module may recognize the phi node 412 as the beginning of the bounded subgraph (i.e., a stopping point).

In another example, the machine-independent optimization module may apply a forwards optimization to data node 414 and may propagate the forwards optimization to the data node 414's successors (e.g., control flow node 416), which the machine-independent optimization module may recognize as the end of the bounded subgraph.

Figure 5:
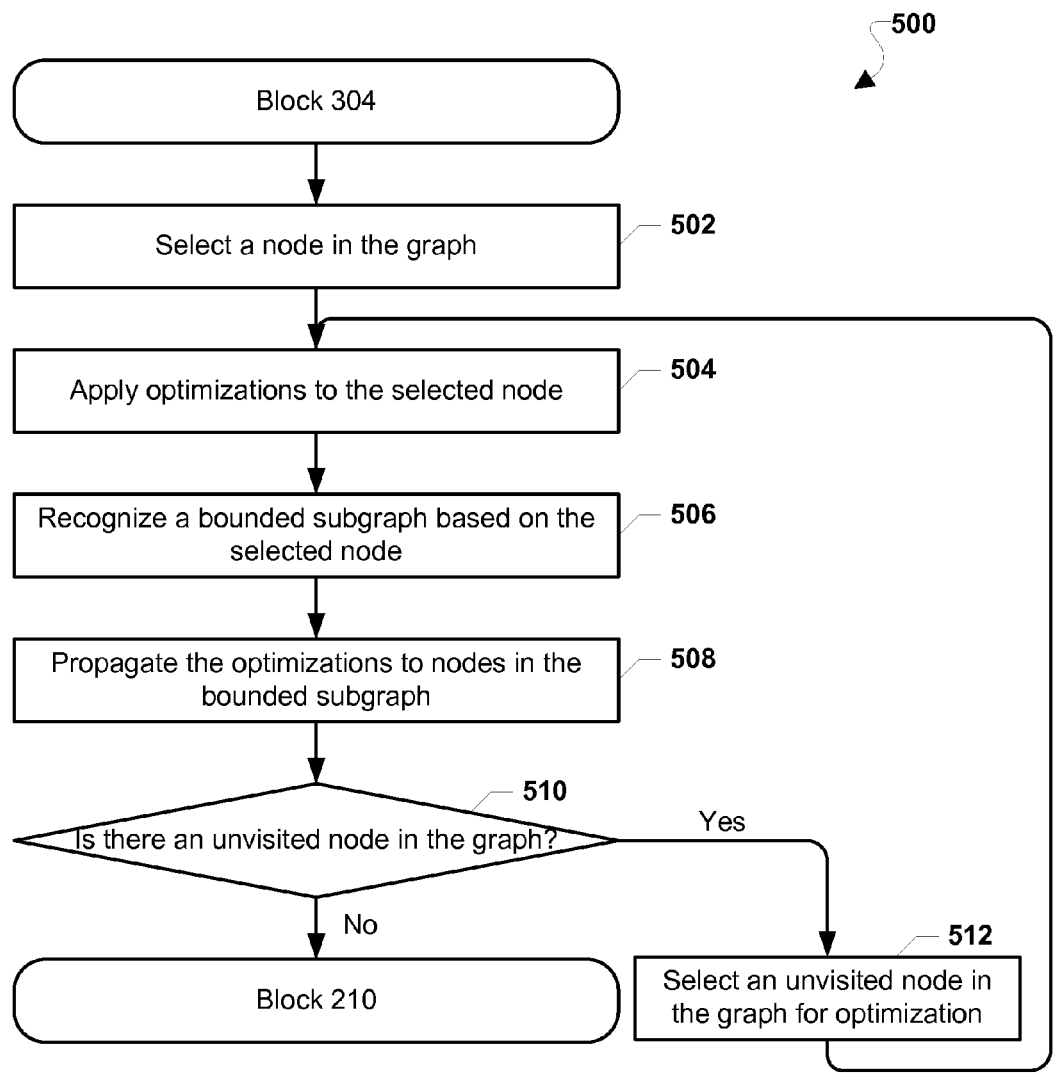
FIG. 5 is a process flow diagram illustrating an aspect method for optimizing a graph generated from an intermediate representation of source code.

FIG. 5 illustrates an aspect method 500 that may be implemented by a machine-independent optimization module for optimizing a graph generated from an IR of source code. In various aspects, the machine independent optimization module may determine the optimization that is the best for each node in the graph and may apply that optimization on the node. In further aspects, the machine-independent optimization module may propagate the node's optimizations to other nodes within the node's bounded subgraph.

In an aspect, the operations of method 500 may represent an overview method for optimizing a graph. As such, the operations of method 500 implement an aspect of the operations of block 306 of method 300 described above with reference to FIG. 3. The machine-independent optimization module may begin performing method 500 after generating a graph from an IR of the source code in block 304 of method 300 as described with reference to FIG. 3.

In block 502, the machine-independent optimization module may select a node in the graph. In an aspect, the machine-independent optimization module may first select a node at the beginning of the graph (i.e., a starting node).

In block 504, the machine-independent optimization module may apply optimizations to the selected node. In an aspect, the machine-independent optimization module may determine to apply one or more forwards and/or backwards optimizations to the selected node. For example, the machine-independent optimization module may determine to apply a backwards optimization to the selected node (e.g., dead code elimination) and may remove the node from the graph as a result.

In block 506, the machine-independent optimization module may recognize a bounded subgraph based on the selected node. In an aspect, the machine-independent optimization module may define a portion of the graph around the selected node to be the selected node's bounded subgraph. In an aspect, the bounded subgraph may be well defined such that the bounded subgraph includes one or more entry nodes that mark the beginning of the bounded subgraph and one or more exit nodes that mark the end of the bounded subgraph. In a further aspect, the one or more entry and exit nodes may be particular types of nodes, such as merge-point nodes, phi nodes, start nodes, end nodes, and other special case nodes. In another aspect, the entry and exit nodes may be defined around natural sections of the code represented by the graph. In other words, the entry and exit nodes may correspond to the beginning and end of a loop instruction, conditional statement, or other discrete segment of code. The process of defining a bounded subgraph based on a selected node is described in further detail below with reference to FIG. 6.

In another aspect, the machine-independent optimization module may recognize the selected node's bounded subgraph dynamically during the process of propagating the optimizations to the selected node's predecessors and/or successors as described with reference to block 508. In other words, the machine-independent optimization module may recognize the natural boundaries (i.e., entry and exit nodes) of the selected node's subgraph without predetermining those boundaries before propagating optimizations from the selected node.

In block 508, the machine-independent optimization module may propagate the optimizations to the nodes in the bounded subgraph. In an aspect, when the machine-independent optimization module determines to apply a forwards optimization to the selected node, the machine-independent optimization module may propagate the forwards optimizations to the selected node's successor nodes until the end of the bounded subgraph is reached (i.e., until one or more exit nodes are reached). In another aspect, when the machine-independent optimization module determines to apply a backwards optimization to the selected node, the machine-independent optimization module may propagate the backwards optimization to the selected node's predecessors within the defined or recognized bounded subgraph. Optimizations are only propagated to nodes within the selected node's bounded subgraph, thus reducing the amount of information that must be stored in the cache as part of the optimization operations in comparison to propagating the optimizations throughout the entire graph. As described above, the machine-independent optimization module may recognize the boundaries of the bounded subgraph dynamically during propagation of the optimizations or as a result of a predetermination of the boundaries of the subgraph.

In determination block 510, the machine-independent optimization module may determine whether there is an unvisited node in the graph. In other words, the machine-independent optimization module may determine whether it has attempted to optimize each node in the graph. In an aspect, the machine-independent optimization module may optimize the graph one node at a time until the entire graph is optimized. In another aspect, during optimization of the graph, the machine-independent optimization module may visit each node a maximum of two times. For example, a node may be selected and have a forwards optimization applied to it (i.e., a first visit), and the node may later have a propagated backwards optimization applied to it (i.e., a second visit). In such an example, the machine-independent optimization module may not visit the node again, and no additional optimizations may be applied to the node.

When the machine-independent optimization module determines that there is an unvisited node in the graph left to optimize (i.e., determination block 510="Yes"), the machine-independent optimization module may select an unvisited node in the graph for optimization in block 512. In an aspect, the machine-independent optimization module may select a node in the graph in block 512 in a manner similar to how the machine-independent optimization module selects a node in the graph in block 502 as described above. In an aspect, the process may continue in a loop as the machine-independent optimization module may continue applying optimizations to selected nodes in the graph in block 504 until the entire graph is optimized.

When the machine-independent optimization module determines that there is no unvisited node in the graph (i.e., determination block 510="No"), the compiler may create machine code from the optimized IR generated from the machine-independent optimization module's optimization of the graph in block 210 of method 200 as described above with reference to FIG. 2.

Figure 6:
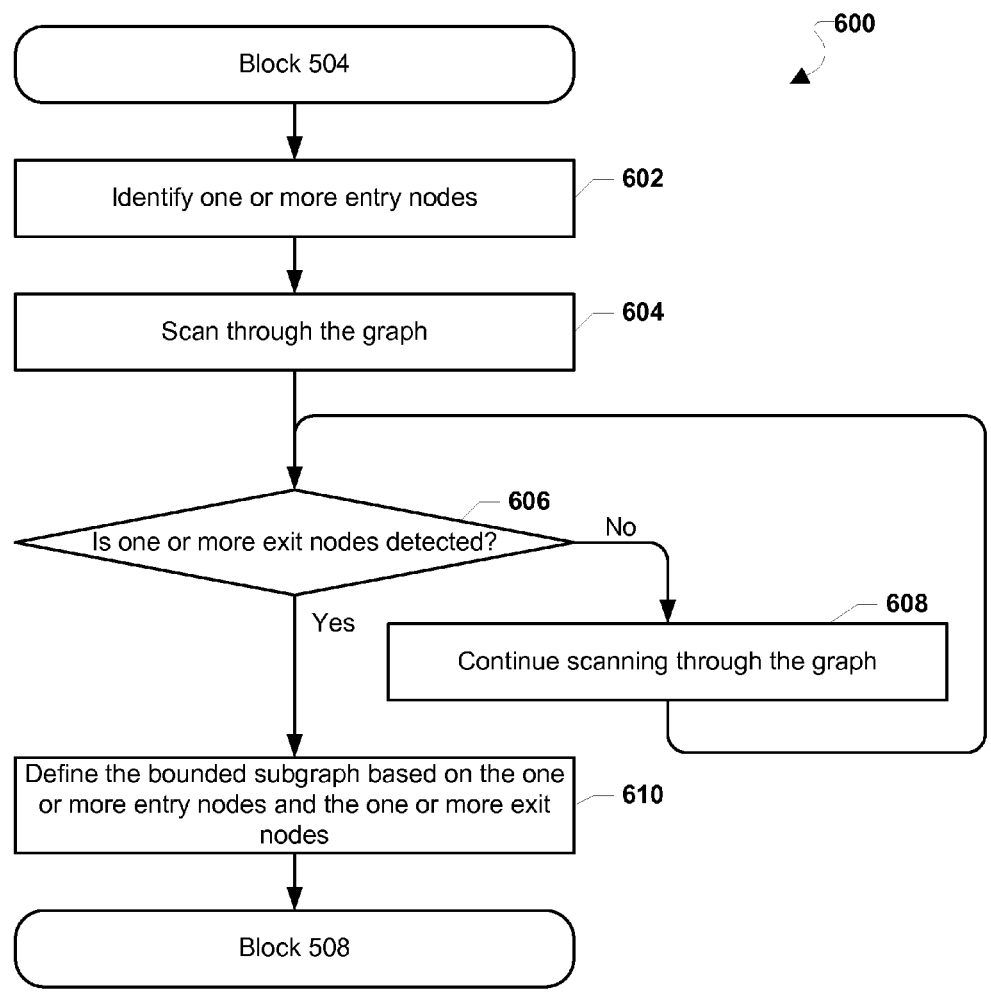
FIG. 6 is a process flow diagram illustrating an aspect method for defining a bounded subgraph in relation to a node selected for optimization.

FIG. 6 illustrates an aspect method 600 that may be implemented by a machine-independent optimization module for defining a bounded subgraph based on a currently selected node. The operations of method 600 implement an aspect of the operations of block 506 of method 500 described above with reference to FIG. 5. The machine-independent optimization module may begin performing method 600 after applying optimizations to a selected node in block 504 of method 500 as described with reference to FIG. 5.

In block 602, the machine-independent optimization module may identify one or more entry nodes. For example, the machine-independent optimization module may traverse the graph backwards from the selected node until it discovers an entry node. In an aspect, an entry node may be a node that corresponds with a logical starting point in the IR or source code. For example, the one or more entry nodes may be the beginning of a looping or conditional segment of code. In another aspect, the one or more entry nodes may be phi nodes or some other "merge" points in which there may be no ambiguity in the value of a variable. In another aspect, the one or more entry nodes may also be on-stack replacement nodes, which may be the beginning of a portion of the graph that represents an inlined function.

In block 604, the machine-independent optimization module may scan through the graph. For example, the machine-independent optimization module may conduct a forward traversal of the graph beginning with the one or more entry nodes' immediate successors and continuing through the one or more entry nodes' more distant descendents. In determination block 606, the machine-independent optimization module may determine whether one or more exit nodes are detected. In an aspect, an exit node may be a logical end point in the IR or source code. In the examples provided above, a logical exit node may correspond to the end of a looping or conditional segment of code. In another aspect, exit nodes may be program exit nodes (e.g., normal exits, exception exits, etc.). In another aspect, exit nodes may represent safepoints in the program used, for example, for garbage collection.

When the machine-independent optimization module determines that one or more exit nodes are not detected (i.e., determination block 606="No"), the machine-independent optimization module may continue scanning through the graph in block 608. This process may continue in a loop until the machine-independent optimization module determines that one or more exit nodes are detected.

When the machine-independent optimization module determines that one or more exit nodes are detected (i.e., determination block 606="Yes"), the machine-independent optimization module may define the bounded subgraph based on the one or more entry nodes and the one or more exit node in block 610. In other words, the bounded subgraph may include the one or more entry nodes, the one or more exit nodes, and intermediary nodes between the entry and exit nodes (e.g., the selected node).

The machine-independent optimization module may continue with the operations in method 500 by propagating the optimizations to nodes in the selected node's bounded subgraph in block 508 of method 500 described above with reference to FIG. 5.

In further aspects, because a bounded subgraph is defined or naturally recognized based on the location of the currently selected node, the machine-independent optimization module may encounter a different bounded subgraph for each selected node. In other words, as the machine-independent optimization module propagates optimizations from a selected node during a single pass of the graph, the nodes affected by the propagated optimizations may be limited to the nodes included in each selected node's particular bounded subgraph.

Figure 7:
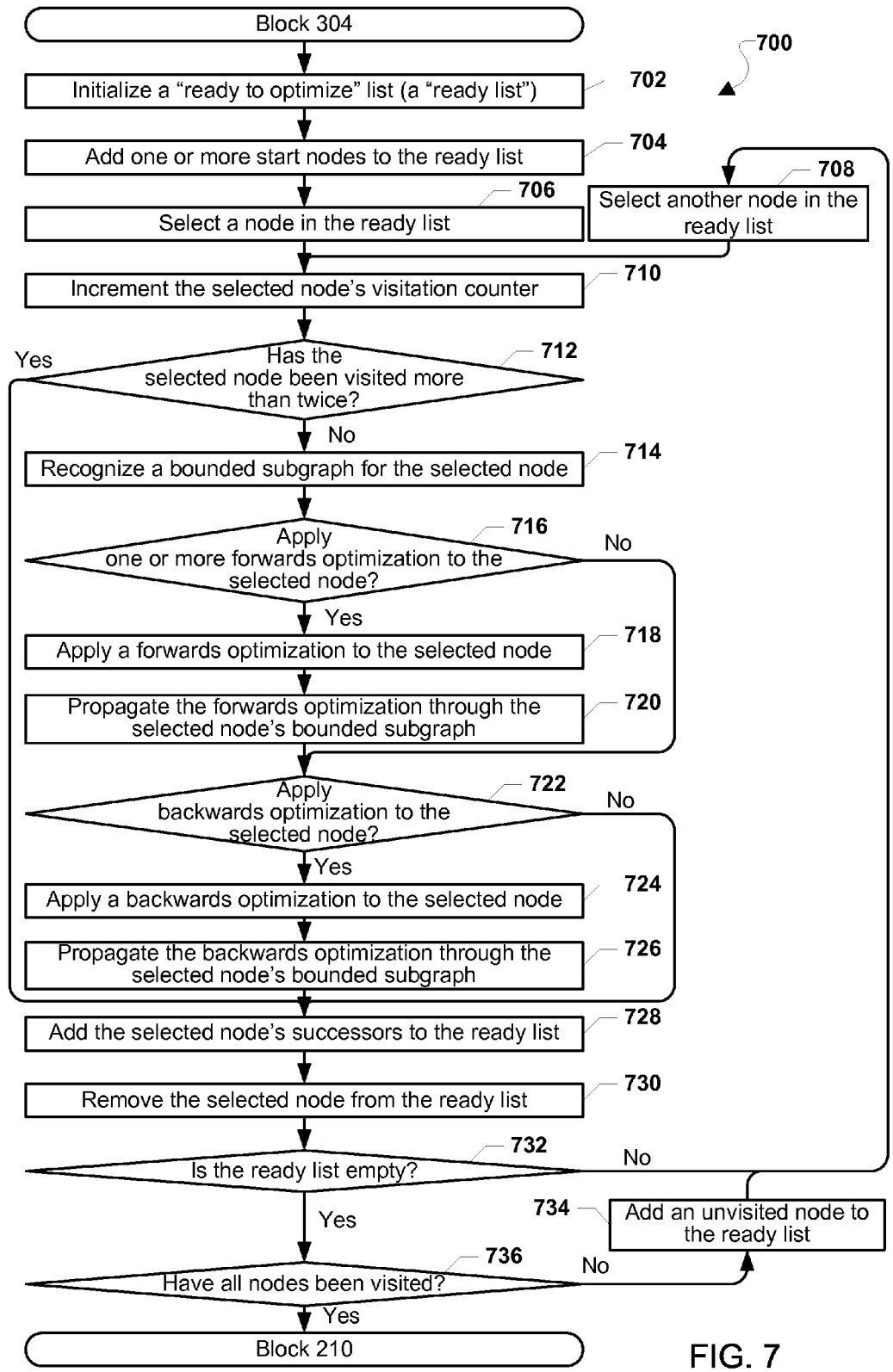
FIG. 7 is a process flow diagram illustrating another aspect method for optimizing a graph generated from an intermediate representation of source code.

FIG. 7 illustrates an aspect method 700 that may be implemented by a machine-independent optimization module for optimizing a graph generated from the IR of the source code in a single pass. The operations of method 700 implement an aspect of the operations of method 500 described above with reference to FIG. 5. Accordingly, the machine-independent optimization module may begin performing method 700 after generating a graph from an IR of the source code in block 304 of method 300 as described with reference to FIG. 3.

In block 702, the machine-independent optimization module may initialize a "ready to optimize list" (i.e., a "ready list"). In an aspect, the ready list may include nodes in the graph that are ready for the machine-independent optimization module to optimize. In another aspect, a node may be "ready" for optimization when the machine-independent optimization module has already visited/optimized the node's predecessors.

In block 704, the machine-independent optimization module may add one or more start nodes to the ready list. In an aspect, a start node may be a first node in the graph. In a further aspect, one or more start nodes may be added to the ready list because, as the first nodes, they have no predecessor nodes.

In block 706, the machine-independent optimization module may select a node in the ready list. In an aspect, the machine-independent optimization module may implement various strategies for selecting the node in the ready list that is selected. For example, the machine-independent optimization module may always attempt to select a control flow node first and may select other nodes only after selecting all available control flow nodes. Selecting a node from the ready list is discussed in further detail below with reference to FIGS. 8A and 8B.

In block 710, the machine-independent optimization module may increment the selected node's visitation counter. In an aspect, the machine-independent optimization module may maintain a count of the number of times each node has been visited. For example, the machine-independent optimization module may maintain a visitation counter for each node that is stored in memory. In another aspect, the machine-independent optimization module may reference each node's visitation counter before visiting the node to ensure that no node in the graph is visited more than twice. In another aspect, rather than a counter, the machine-independent optimization module may utilize other mechanisms to identify when a node is no longer eligible for further optimizations, such as by setting a flag to "finished" to indicate when the node has already been visited twice or by utilizing lists or tables.

In determination block 712, the machine-independent optimization module may determine whether the selected node has been visited more than twice. In an aspect, the machine-independent optimization module may visit each node in the graph a maximum of two times while performing the single pass of the graph. By limiting the number of times each node may be optimized (i.e., visited), the machine-independent optimization module ensures a reasonable optimization/compile time without compromising the quality of the optimizations made on the code.

When the machine-independent optimization module determines that the selected node has been visited more than twice (i.e., determination block 712="Yes"), the machine-independent optimization module may continue performing method 700 in block 728 by adding successors of the selected node to the ready list as described below. In other words, the machine-independent optimization module may determine that a node that has been already been visited twice may be ineligible for further optimization and may skip over that node.

On the other hand, when the machine-independent optimization module determines that the selected node has not been visited more than twice (i.e., determination block 712="No"), the machine-independent optimization module may recognize a bounded subgraph for the selected node in block 714. In an aspect, the machine-independent optimization module may predetermine the boundaries of a bounded subgraph for the selected node by performing the operations of method 600 described with reference to FIG. 6. In other words, the machine-independent optimization module may identify one or more entry nodes and one or more exit nodes based on the position of the selected node and predetermine that the bounded subgraph includes the one or more entry nodes, the one or more exit nodes, and intermediary nodes (including the selected node) between the entry and exit nodes. In another aspect, the machine-independent optimization may naturally discover the boundaries of the selected node's subgraph during propagation of forwards and/or backwards optimizations without predetermining the bounded subgraph's boundaries.

In determination block 716, the machine-independent optimization module may determine whether to apply one or more forwards optimizations to the selected node. For example, the machine-independent optimization module may determine whether the selected node is eligible or would benefit from any combination of several forwards optimizations, such as sparse conditional constant propagation or global value numbering optimizations. When the machine-independent optimization module determines not to apply forwards optimization to the selected node (i.e., determination block 716="No"), the machine-independent optimization module may continue performing by determining whether to apply backwards optimization to the selected node in determination block 722.

When the machine-independent optimization module determines to apply forwards optimization to the selected node (i.e., determination block 716="Yes"), the machine-independent optimization module may apply the forwards optimization to the selected node in block 718. For example, the machine-independent optimization module may apply global value numbering to the selected node, which may assign the same value number to variables and expressions that are provably equivalent. In another aspect, the machine-independent optimization module may carry forward previous forwards optimizations to the currently selected node.

In block 720, the machine-independent optimization module may propagate the forwards optimization through the selected node's bounded subgroup. In an aspect, the machine-independent optimization module may attempt to propagate the forwards optimization to the selected node's successors and stop when the boundary of the bounded subgraph is reached (i.e., stop after propagating the forwards optimizations to the one or more exit nodes). The process of propagating the forwards optimization through the bounded subgraph is further described below with reference to FIG. 9.

In determination block 722, the machine-independent optimization module may determine whether to apply backwards optimization to the selected node. For example, the machine-independent optimization module may determine whether the selected node includes dead or unreachable code (i.e., a "dead code elimination" optimization). When the machine-independent optimization module determines not to apply backwards optimizations to the selected node (i.e., determination block 722="No"), the machine-independent optimization module may continue performing method 700 by adding successors of the selected node to the ready list in block 728.

When the machine-independent optimization module determines that it should apply backwards optimization on the selected node (i.e., determination block 722="Yes"), the machine-independent optimization module may apply a backwards optimization to the selected node in block 724. If the machine-independent optimization module determines that the selected node includes only dead or unreachable code it may remove the selected node to simplify/optimize the overall graph. Once a node is removed from the graph, the machine-independent optimization module may not visit the node again and may update the node's predecessors and successors to reflect the node's removal.

In block 726, the machine-independent optimization module may propagate the backwards optimization through the selected node's bounded subgraph. The machine-independent optimization module may propagate the backwards optimizations because the machine-independent optimization module processes each node dynamically (i.e., "on-the-fly"). Thus, after processing a later node, the machine-independent optimization module may need to propagate the optimizations backwards to determine if the optimizations of the currently selected node open up additional optimizations in the currently selected node's predecessors. For example, if the machine-independent optimization module determines that the selected node only includes dead code (e.g., by applying dead code elimination optimization) it may remove the selected node from the graph. In this example, the machine-independent optimization module may trace the selected node's predecessors to determine whether to apply backwards optimizations on the predecessors given the selected node's removal from the graph. In other words, the machine-independent optimization module may determine whether the predecessor nodes should remain in the graph once the selected node has been removed from the graph.

In block 728, the machine-independent optimization module may add the selected node's successors to the ready list. In an aspect, the machine-independent optimization module may add a successor node to the ready list when all of the successor node's predecessors have been visited/processed. In another aspect, by only adding successor nodes to the ready list, the machine-independent optimization module may ensure that a node's first visit is not during the propagation of a backwards optimization.

In block 730, the machine-independent optimization module may remove the selected node from the ready list. While the selected node is removed from the ready list, the selected node may be visited for a second time during the propagation of backwards optimizations from one of the selected node's successor nodes.

In determination block 732, the machine-independent optimization module may determine whether the ready list is empty. In an aspect, the ready list may periodically become empty for various reasons. For example, a node may have a predecessor that has not been processed (e.g., the predecessor node is not reachable from a start node). When the machine-independent optimization module determines that the ready list is not empty (i.e., determination block 732="No"), the machine-independent optimization module may select another node in the ready list for optimization in block 708. In an aspect, the machine-independent optimization module may select another node in block 708 in a manner similar to the one described above with reference to block 706. The process may continue in a loop as the machine-independent optimization module may continue to select other nodes in the ready list in block 708 until the ready list is empty.

When the machine-independent optimization module determines that the ready list is empty (i.e., determination block 732="Yes"), the machine-independent optimization module may determine whether all nodes in the graph have been visited in determination block 736. In an aspect, some nodes may be unreachable from the start node and thus may not have been visited because they are not descendents of the start node.

When the machine-independent optimization module determines that all nodes have not been visited (i.e., determination block 736="No"), the machine-independent optimization module may add an unvisited node to the ready list in block 734. For example, the machine-independent optimization module may add a node that is unreachable from the start node to the ready list. In an aspect, this process may continue in a loop as the machine-independent optimization module may continue performing method 700 until all nodes in the graph are optimized, eliminated, or visited twice.

When the machine-independent optimization module determines that all nodes have been visited (i.e., determination block 736="Yes"), the compiler may generate machine code from the optimized intermediate representation in block 210 of method 200 described above with reference to FIG. 2. In other words, the machine-independent optimization module may have completed the single-pass optimization of the graph when all nodes have been optimized/visited, and the compiler may continue by turning the optimized graph into machine code.

Figure 8A:
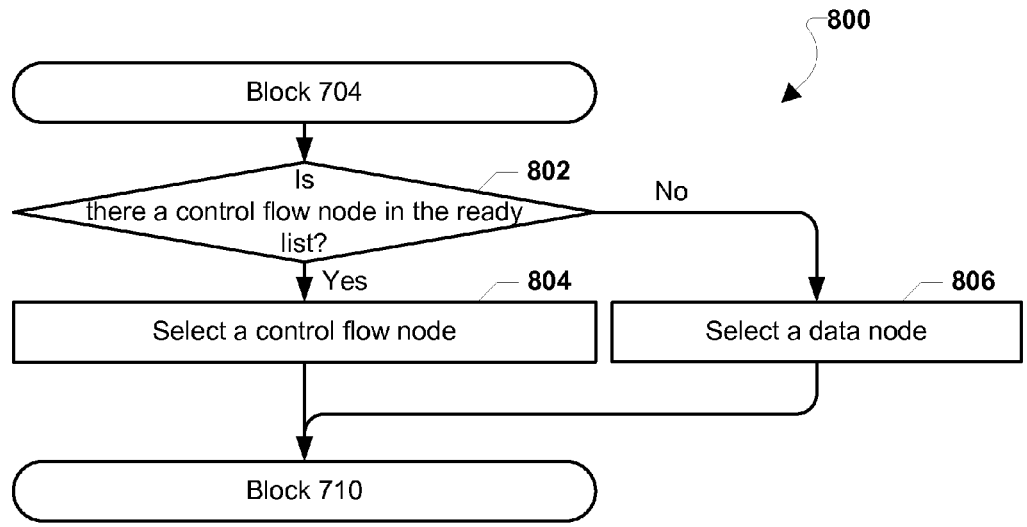
FIGS. 8A-8B are process flow diagrams illustrating aspect methods for selecting a node in a ready-to-optimize list for optimization.
Figure 8B:
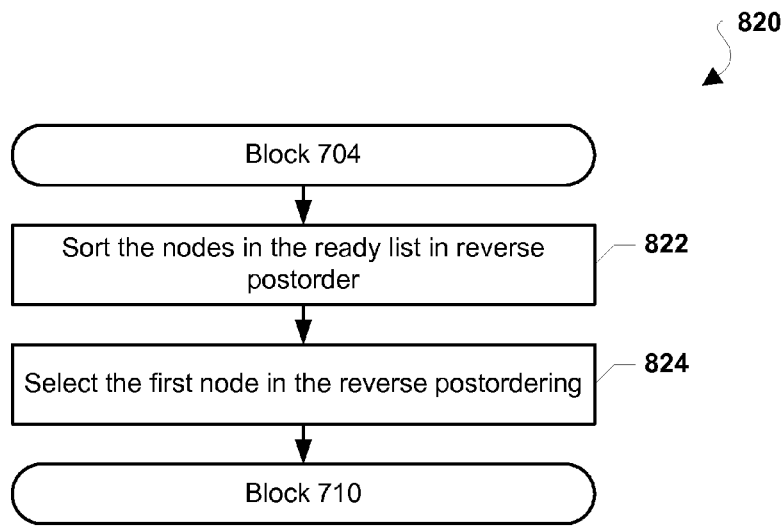

FIGS. 8A and 8B illustrate aspect methods 800, 820 that may be implemented by a machine-independent optimization module for selecting a node in the ready list. These aspect methods may have different compilation speeds and other performance trade-offs.

The operations of methods 800, 820 implement aspects of the operations of block 706 of method 700 described above with reference to FIG. 7. In various aspects, the machine-independent optimization module may implement a priority or sorting technique to select nodes in the ready list. The machine-independent optimization module may begin performing methods 800, 820 after adding the start node to the ready list in block 704 of method 700 described above with reference to FIG. 7.

FIG. 8A illustrates an aspect method 800 for selecting a node in the ready list based on the type of node. In determination block 802, the machine-independent optimization module may determine whether there is a control flow node in the ready list. A control flow node may be a node that controls the flow of operations, such as loops, conditional statements, and function calls. In an aspect, the machine-independent optimization module may give a higher priority to control flow nodes than other types of nodes.

When the machine-independent optimization module determines that there is a control flow node in the ready list (i.e., determination block 802="Yes"), the machine-independent optimization module may select a control flow node in block 804. While not illustrated, in another aspect, the machine-independent optimization module may apply a further sorting criterion to determine the particular control flow node that is selected when there is more than one control flow node in the ready list. For example, the machine-independent optimization module may select the control flow node that is closest to the start node, or the machine-independent optimization module may select the control flow node that was added to the ready list first. The machine-independent optimization module may continue with the operations in method 700 by incrementing the selected node's visitation counter in block 710 as described with reference to FIG. 7.

When the machine-independent optimization module determines that there are no control flow nodes in the ready list (i.e., determination block 802="No"), the machine-independent optimization module may select a data node in block 806. In an aspect, a flow node may be a node corresponding with various data manipulations, such as addition, subtraction, assignment, etc. In another aspect, the machine-independent optimization module may employ secondary sorting criteria to select the data node when more than one data node is in the ready list. The machine-independent optimization module may continue with the operations in method 700 by incrementing the selected node's visitation counter in block 710 as described with reference to FIG. 7.

FIG. 8B illustrates an aspect method 820 for selecting a node in the ready list based on a reverse postordering of the nodes. In block 822, the machine-independent optimization module may sort the nodes in the ready list in reverse postorder. In an aspect, the machine-independent optimization module may sort the nodes in reverse postorder by ordering the nodes in the order they were last visited (i.e., a postordering) and reversing that ordering. In another aspect, implementing a reverse postordering of the nodes in the ready list may be useful as reverse postordering produces a topological sorting of graphs (e.g., directed acyclic graphs and cyclical graphs) and often represents a natural linearization of control flow. In block 824, the machine-independent optimization module may select the first node in the reverse postordering.

The machine-independent optimization module may continue with the operations in method 700 by incrementing the selected node's visitation counter in block 710 as described with reference to FIG. 7.

While not illustrated in FIGS. 8A and 8B, in another aspect, it is anticipated that the machine-independent optimization module may perform operations similar to those described with reference to methods 800, 820 when selecting another node in the ready list in block 708 of method 700 described above with reference to FIG. 7. In such an aspect, the machine-independent optimization module may perform methods 800, 820 or operations analogous to those described with reference to methods 800, 820 after determining that the ready list is not empty (i.e., determination block 732="No") or after adding an unvisited node to the ready list in block 734 of method 700 described above with reference to FIG. 7.

Figure 9:
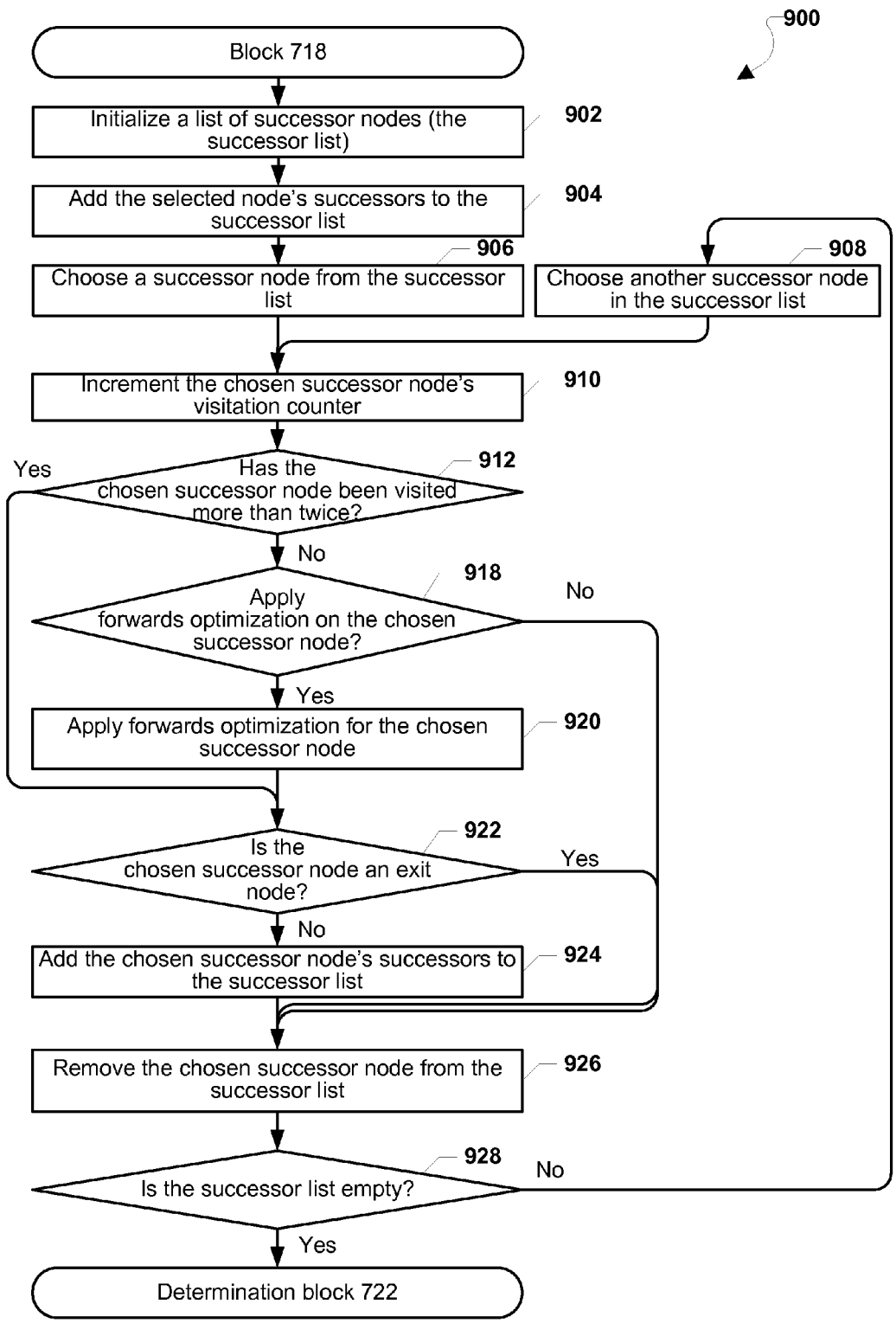
FIG. 9 is a process flow diagram illustrating an aspect method for propagating a forwards optimization to a selected node's successors in a bounded subgraph.

FIG. 9 illustrates an aspect method 900 that may be implemented by a machine-independent optimization module for propagating forwards optimizations to a selected node's successors within the selected node's bounded subgraph. The operations of method 900 implement an aspect of the operations of block 720 of method 700 described above with reference to FIG. 7. The machine-independent optimization module may begin performing method 900 after applying one or more forwards optimizations to the selected node in block 718 of method 700 described above with reference to FIG. 7.

In block 902, the machine-independent optimization module may initialize a list of successor nodes (i.e., the "successor list"). In an aspect, the machine-independent optimization module may use the successor list in a manner similar to the ready list. In other words, the machine-independent optimization module may add successor nodes to the list, process those successor nodes, and remove them from the list after processing.

In block 904, the machine-independent optimization module may add the selected node's successors to the successor list. In block 906, the machine-independent optimization module may choose a successor node from the successor list. In an aspect, the machine-independent optimization module may implement various sorting strategies and select a successor node based on its order. For example, the machine-independent optimization module may sort the nodes by type and select control nodes first.

In block 910, the machine-independent optimization module may increment the chosen successor node's visitation counter. In determination block 912, the machine-independent optimization module may determine whether the chosen successor node has been visited more than twice. In an aspect, the chosen successor node may have previously been visited under various circumstances. For example, the chosen successor node may have been selected/visited as described with reference to FIG. 7. In another example, the machine-independent optimization module may have visited the chosen successor node during one or more optimization propagations from other selected nodes. For instance, the chosen successor node may have been visited a first time during a forwards propagation from a first selected node and visited a second time during a subsequent forwards propagation from a second selected node. In other words, the node may have been included in more than one bounded subgraph for different selected nodes and may have been visited during multiple optimization propagations.

In an aspect, the machine-independent optimization module may not visit/optimize a node more than two times during the single pass of the graph, and the machine-independent optimization module may check the chosen successor node's visitation counter to ensure that the chosen successor node is eligible for further optimization. For example, the machine-independent optimization module may revisit a successor node for which it has previously performed a forwards optimization, meaning that the node has now been visited twice, and the machine-independent optimization module may indicate that the node is now ineligible for further optimization.

In another aspect (not shown), the machine-independent optimization module may determine whether the chosen successor node has been visited twice by checking that the chosen successor node's flag is set to "finished," which may indicate that the chosen successor node has been visited twice and that the chosen successor node is ineligible for further optimizations. In another aspect, the machine-independent optimization module may utilize various other methods of tracking the number of times each node in the graph has been visited (e.g., tables, lists, etc.).

When the machine-independent optimization module determines that the chosen successor node has been visited more than twice (i.e., determination block 912="Yes"), the machine-independent optimization module may continue performing method 900 by determining whether the chosen successor node is an exit node in determination block 922.

When the machine-independent optimization module determines that the chosen successor node has not been visited more than twice (i.e., determination block 912="No"), the machine-independent optimization module may determine whether to apply forwards optimizations to the chosen successor node in determination block 918.

In an aspect, the machine-independent optimization module may determine whether to apply forwards optimizations on the chosen successor node based on criteria similar to the ones the machine-independent optimization module relies on when determining whether to apply forwards optimizations on the selected node in determination block 716 of method 700 described above with reference to FIG. 7.

When the machine-independent optimization module determines not to apply forwards optimizations on the chosen successor node (i.e., determination block 918="No"), the machine-independent optimization module may remove the chosen successor node from the successor list in block 926. In an aspect, the machine-independent optimization module may not propagate forwards optimization to the successors of a chosen successor node in response to determining not to apply forwards optimizations on the chosen successor node.

When the machine-independent optimization module determines that it should apply forwards optimizations on the chosen successor node (i.e., determination block 918="Yes"), the machine-independent optimization module may apply forwards optimizations for the chosen successor node in block 920.

In determination block 922, the machine-independent optimization module may determine whether the chosen successor node is an exit node. As discussed above, an exit node may indicate the outer most boundary of the selected node's bounded subgraph. In other words, the exit node may indicate a well-defined stopping point in the propagation of forwards optimizations. In an aspect, an exit node may be an end node, a phi node, or another node that indicates a logical stopping point in forwards propagation (e.g., a node that corresponds to the end of a conditional statement in the source code). In a further aspect, a bounded subgraph may include one or more exit nodes. Thus, the machine-independent optimization module may not propagate the forwards optimizations further than an exit node. In a further aspect, the machine-independent optimization module may recognize that a node is an exit node dynamically (i.e., on the fly) or as a result of predetermining the boundaries of the selected node's bounded subgraph.

When the machine-independent optimization module determines that the chosen successor node is an exit node (i.e., determination block 922="Yes"), the machine-independent optimization module may remove the chosen successor node from the successor list in block 926. In an aspect, because the exit node indicates a stopping point in propagation of forwards optimizations, the machine-independent optimization module may not propagate the forwards optimizations to the chosen successor node's successors.

On the other hand, when the machine-independent optimization module determines that the chosen successor node is not an exit node (i.e., determination block 922="No"), the machine-independent optimization module may add the chosen successor node's successors to the successor list in block 924. In other words, the machine-independent optimization module may continue propagating the forwards optimizations to the chosen successor node's successors. The machine-independent optimization module may also remove the chosen successor node from the successor list in block 926.

In determination block 928, the machine-independent optimization module may determine whether the successor list is empty. In other words, the machine-independent optimization module may determine whether it has finished propagating forwards optimizations through the selected node's bounded subgraph. When the machine-independent optimization module determines that the successor list is not empty (i.e., determination block 928="No"), the process may continue in a loop as the machine-independent optimization module may choose another successor node in the successor list in block 908 and perform the operations described above until the successor list is empty.

When the machine-independent optimization module determines that the successor list is empty (i.e., determination block 928="Yes"), the machine-independent optimization module may continue performing in block determination block 722 of method 700 described above with reference to FIG. 7 by determining whether to apply backwards optimizations to the selected node.

Figure 10:
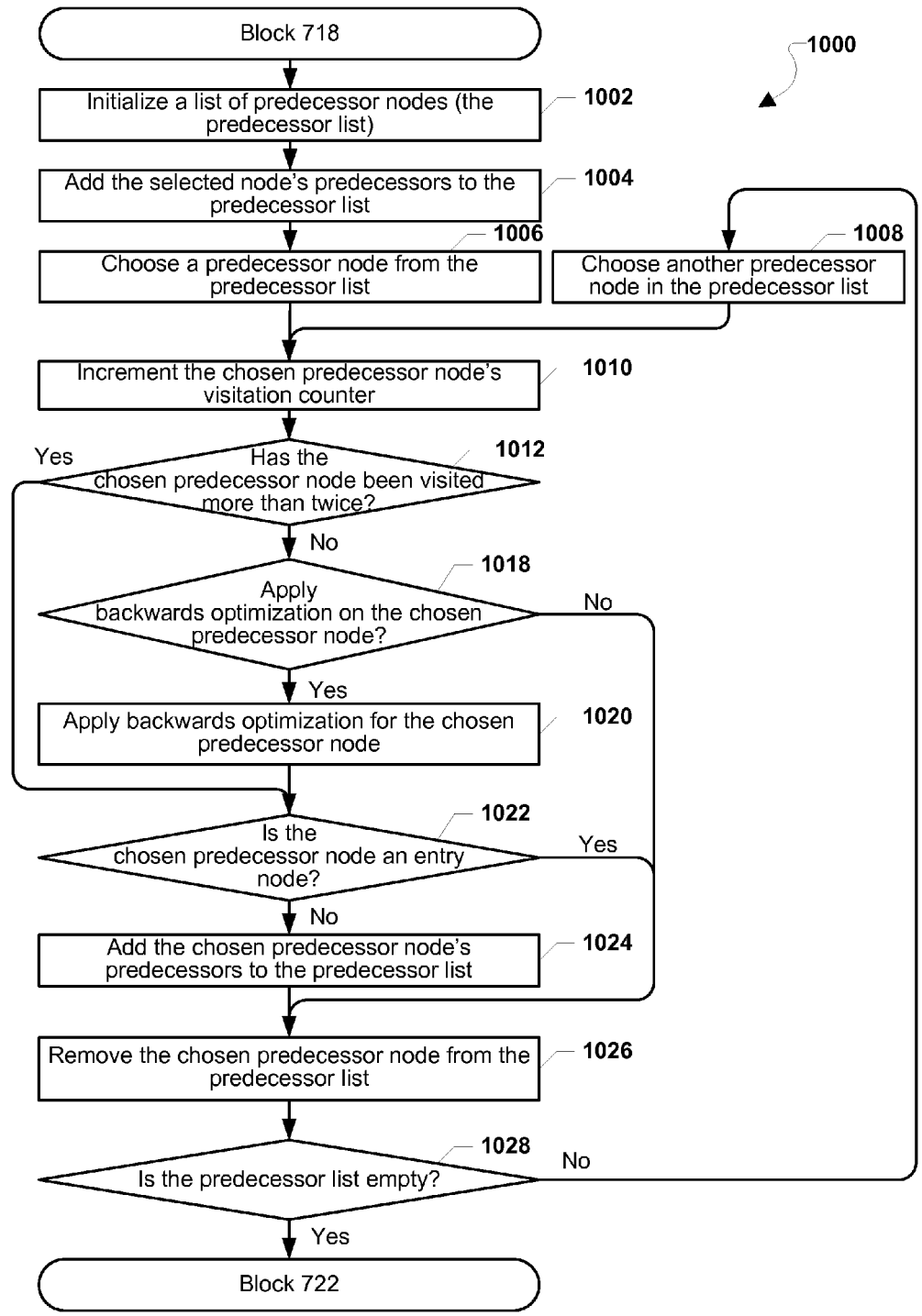
FIG. 10 is a process flow diagram illustrating an aspect method for propagating a backwards optimization to a selected node's predecessors in a bounded subgraph.

FIG. 10 illustrates an aspect method 1000 that may be implemented by a machine-independent optimization module for propagating backwards optimizations to a selected node's predecessors included in the selected node's bounded subgraph. The operations of method 900 implement an aspect of the operations of block 726 of method 700 described above with reference to FIG. 7. The machine-independent optimization module may begin performing method 1000 after applying one or more backwards optimizations to the selected node in block 724 of method 700 described above with reference to FIG. 7.

In block 1002, the machine-independent optimization module may initialize a list of predecessor nodes (i.e., the "predecessor list"). In an aspect, the machine-independent optimization module may use the predecessor list in a manner similar to the ready list or successor lists described above. The machine-independent optimization module may add predecessor nodes to the list, process those predecessor nodes, and remove them from the list after processing.

In block 1004, the machine-independent optimization module may add the selected node's predecessors to the predecessor list. In block 1006, the machine-independent optimization module may choose a predecessor node from the predecessor list. In an aspect, the machine-independent optimization module may implement various sorting strategies and select a predecessor node based on its order. For example, the machine-independent optimization module may sort the nodes by type and select control nodes first.

In determination block 1010, the machine-independent optimization module may increment the chosen predecessor node's visitation counter. In determination block 1012, the machine-independent optimization module may determine whether the chosen predecessor node has been visited more than twice. In an aspect, the chosen predecessor node may have previously been visited under various circumstances as described above with reference to determination block 912 of method 900 described with reference to FIG. 9. In an aspect, the machine-independent optimization module may not visit/optimize a node more than two times as described above.

When the machine-independent optimization module determines that the chosen predecessor node has been visited more than twice (i.e., determination block 1012="Yes"), the machine-independent optimization module may determine whether the chosen predecessor node is an entry node in determination block 1022. In an aspect, an entry node may represent the beginning of a selected node's bounded subgraph and may indicate the stopping point for backwards propagation of backwards optimizations. In other words, similar to how the machine-independent optimization module may stop propagating forwards optimizations on reaching an exit node as described above with reference to FIG. 9, the machine-independent optimization module may not propagate backwards optimizations to the predecessors of an entry node. Thus, as with forwards optimizations, the machine-independent optimization module may only propagate backwards optimizations to nodes included in the selected node's bounded subgraph. As also described above, in a further aspect, the machine-independent optimization module may recognize that a node is an entry node dynamically (i.e., on the fly) or as a result of predetermining the boundaries of the selected node's bounded subgraph.

When the machine-independent optimization module determines that the chosen predecessor node has not been visited more than twice (i.e., determination block 1012="No"), the machine-independent optimization module may determine whether to apply backwards optimizations on the chosen predecessor node in determination block 1018.

In an aspect, the machine-independent optimization module may determine whether to apply backwards optimizations on the chosen predecessor node based on criteria similar to the ones the machine-independent optimization module relies on when determining whether to apply backwards optimizations on the selected node in determination block 722 of method 700 described above with reference to FIG. 7. For example, the machine-independent optimization module may determine whether the chosen predecessor node includes dead or unreachable code.

When the machine-independent optimization module determines not to apply backwards optimizations on the chosen predecessor node (i.e., determination block 1018="No"), the machine-independent optimization module may remove the chosen predecessor node from the predecessor list in block 1026. In an aspect, the machine-independent optimization module may not propagate backwards optimizations to the chosen predecessor node's predecessors in response to determining not to apply backwards optimizations to the chosen predecessor node.

When the machine-independent optimization module determines to apply backwards optimizations on the chosen predecessor node (i.e., determination block 1018="Yes"), the machine-independent optimization module may apply backwards optimizations for the chosen predecessor node in block 1020. For example, the machine-independent optimization module may apply dead code elimination techniques or other backwards optimizations.

In determination block 1022, the machine-independent optimization module may determine whether the chosen predecessor node is an entry node. As discussed above, an entry node may indicate a stopping point in the propagation of backwards optimizations. An entry node may be the start node, a merge point, a source node, a phi node, or another node that indicates a logical stopping point in backwards propagation. Thus, to stay within the boundaries of the selected node's bounded subgraph, the machine-independent optimization module may not propagate the backwards optimizations further than an entry node.

When the machine-independent optimization module determines that the chosen predecessor node is an entry node (i.e., determination block 1022="Yes"), the machine-independent optimization module may remove the chosen predecessor node from the predecessor list in block 1026.

On the other hand, when the machine-independent optimization module determines that the chosen predecessor node is not an entry node (i.e., determination block 1022="No"), the machine-independent optimization module may add the chosen predecessor node's predecessors to the predecessor list in block 1024. In other words, the machine-independent optimization module may continue propagating the backwards optimizations to the chosen predecessor node's predecessors. The machine-independent optimization module may also remove the chosen predecessor node from the predecessor list in block 1026.

In determination block 1028, the machine-independent optimization module may determine whether the predecessor list is empty. In other words, the machine-independent optimization module may determine whether it has finished propagating backwards optimizations. When the machine-independent optimization module determines that the predecessor list is not empty (i.e., determination block 1028="No"), the process may continue in a loop as the machine-independent optimization module may continue performing method 1000 by selecting another predecessor node in the predecessor list in block 1008 and perform the operations described above until the predecessor list is empty.

When the machine-independent optimization module determines that the predecessor list is empty (i.e., determination block 1028="Yes"), the machine-independent optimization module may continue with the operations in method 700 by adding successors of the selected node to the ready list in block 728 as described above with reference to FIG. 7.

Figure 11:
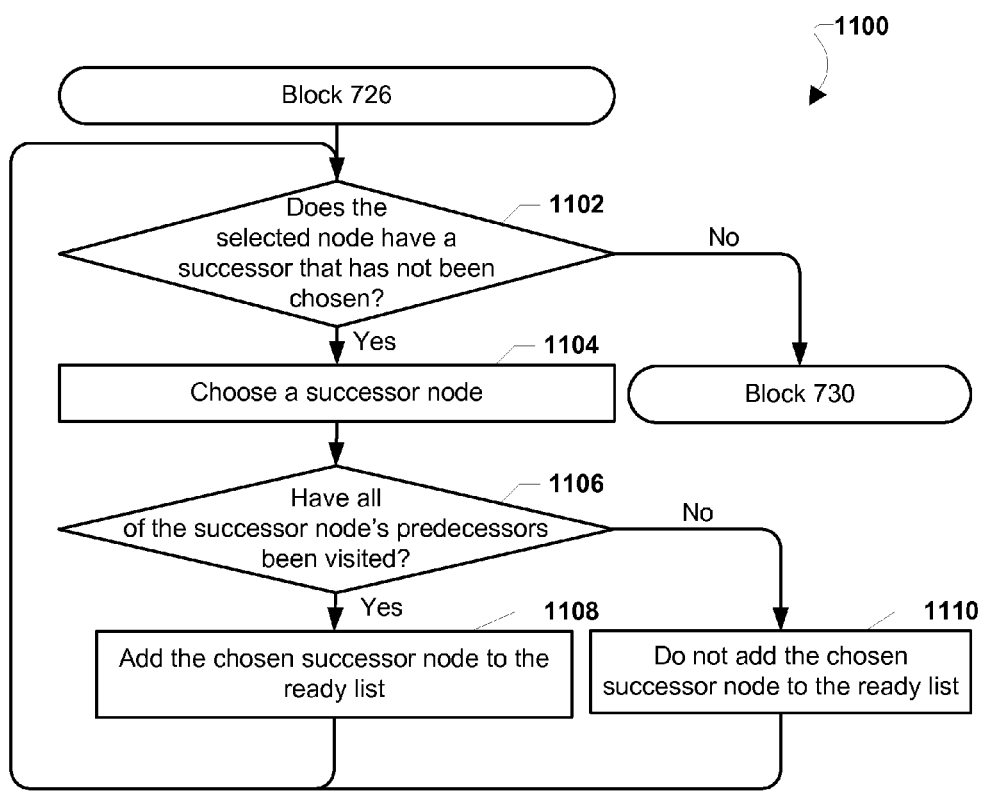
FIG. 11 is a process flow diagram illustrating an aspect method for adding a node's successors to the ready-to-optimize list.

FIG. 11 illustrates an aspect method 1100 that may be implemented by a machine-independent optimization module for adding a selected node's successors to the ready list. The operations of method 1100 implement an aspect of the operations of block 728 of method 700 described above with reference to FIG. 7. The machine-independent optimization module may begin performing method 1100 after propagating the backwards optimizations through the selected node's bounded subgraph in block 726 of method 700 as described above with reference to FIG. 7.

In determination block 1102, the machine-independent optimization module may determine whether the selected node has a successor that has not been chosen. In an aspect, the machine-independent optimization module may determine whether any of the successor nodes have not yet been chosen for processing. When the machine-independent optimization module determines that all of the selected node's successors have been chosen (i.e., determination block 1102="No"), the machine-independent optimization module may continue with the operations in method 700 by removing the selected node from the ready list in block 730 as described above with reference to FIG. 7.

On the other hand, when the machine-independent optimization module determines that the selected node has a successor that has not been chosen yet (i.e., determination block 1102="Yes"), the machine-independent optimization module may choose a successor node in block 1104. In an aspect, the machine-independent optimization module may choose the successor node based on a priority ordering, such as by node type.

In determination block 1106, the machine-independent optimization module may determine whether the chosen successor node's predecessors have all been visited. In an aspect, a node may be added to the ready list as a successor node only when all of its predecessors have been optimized/visited. For example, if the selected node has a successor node that has a second predecessor node that has not yet been visited, the machine-independent optimization module may not add the chosen successor node to the ready list.

When the machine-independent optimization module determines that the chosen successor node's predecessors have all been visited (i.e., determination block 1106="Yes"), the machine-independent optimization module may add the chosen successor node to the ready list in block 1108. The process may continue in a loop until the machine-independent optimization module determines that the selected node's successors have all been chosen (i.e., determination block 1102="No").

On the other hand, when the machine-independent optimization module determines that the chosen successor node has one or more predecessors that have not been visited (i.e., determination block 1106="No"), the machine-independent optimization module may not add the chosen successor node to the ready list in block 1110. The process may continue in a loop until the machine-independent optimization module determines that the selected node's successors have all been chosen (i.e., determination block 1102="No").

Figure 12A:
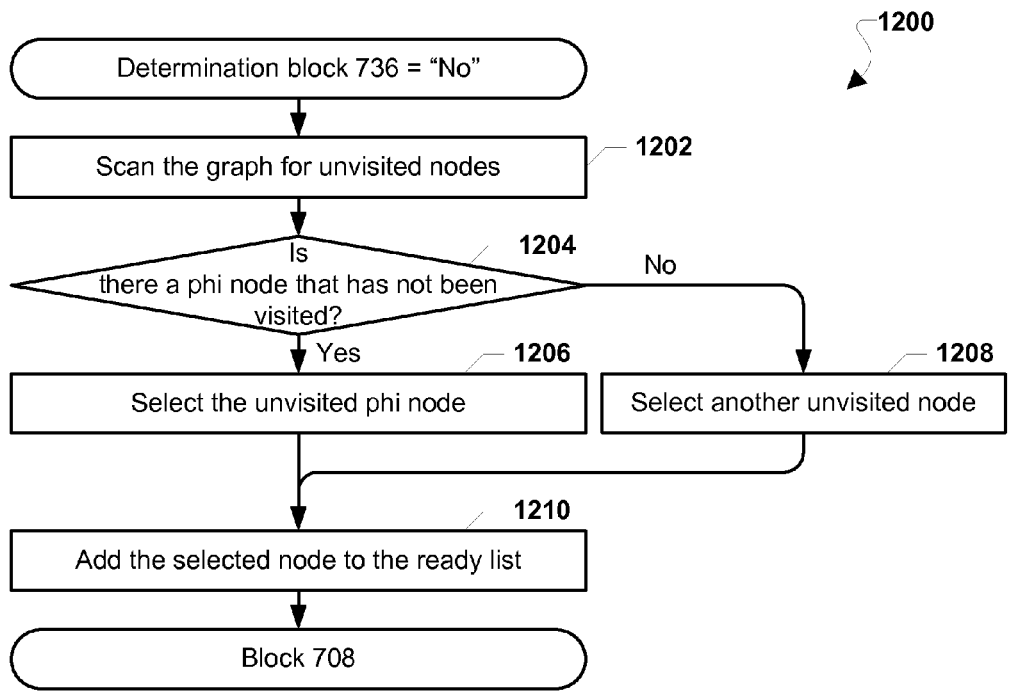
FIGS. 12A-12B are process flow diagrams illustrating aspect methods for adding an unvisited node to the ready-to-optimize list when the ready-to-optimize list is empty.
Figure 12B:
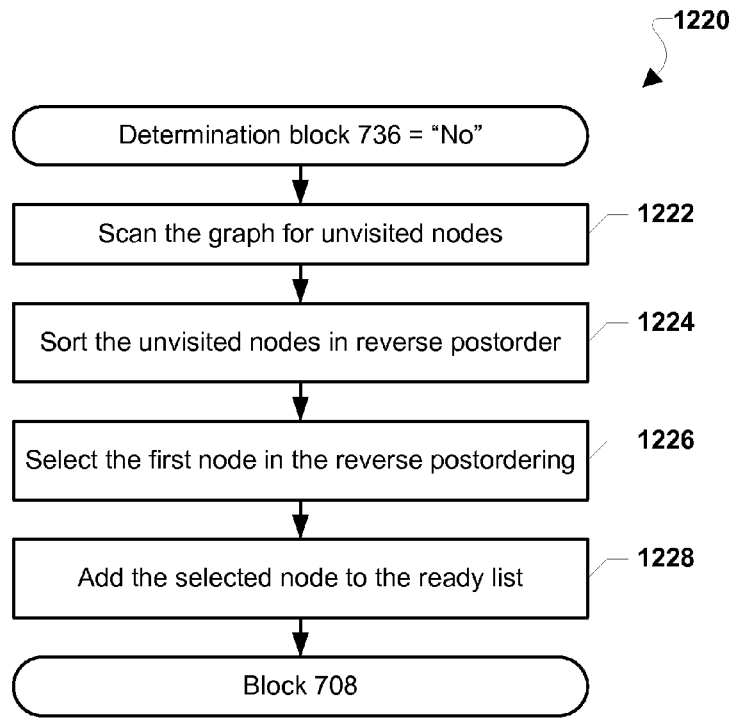

FIGS. 12A and 12B illustrate aspect methods 1200, 1220 that may be implemented by a machine-independent optimization module for adding an unvisited node to the ready list based on a sorting criterion. These aspect methods may have different compilation speeds and other performance tradeoffs.

The operations of methods 1200, 1220 implement aspects of the operations of block 734 of method 700 described above with reference to FIG. 7. In an aspect, the machine-independent optimization module may begin performing methods 1200, 1220 after determining that all nodes in the graph have not been visited (i.e., determination block 736="No").

FIG. 12A illustrates an aspect method 1200 for adding an unvisited node to the ready list based on node type. In block 1202, the machine-independent optimization module may scan the graph for unvisited nodes. For example, the machine-independent optimization module may discover one or more nodes that are unreachable from the start node or are otherwise unconnected to the graph.

In determination block 1204, the machine-independent optimization module may determine whether there is a phi node that has not been visited. In an aspect, phi nodes may have a higher priority than other types of nodes. If the machine-independent optimization module determines that there is an unvisited phi node (i.e., determination block 1204="Yes"), the machine-independent optimization module may select the unvisited phi node in block 1206. On the other hand, when the machine-independent optimization module determines that there is no unvisited phi node (i.e., determination block 1204="No"), the machine-independent optimization module may select another unvisited node in block 1208. For example, the machine-independent optimization module may select a control flow node or a data node.

In block 1210, the machine-independent optimization module may add the selected node to the ready list. The machine-independent optimization module may continue with the operations in method 700 by selecting another node in the ready list in block 708 as described above with reference to FIG. 7.

FIG. 12B illustrates another aspect method 1220 for adding an unvisited node to the ready list based a reverse postordering of the unvisited nodes. In block 1222, the machine-independent optimization module may scan the graph for unvisited nodes. In block 1224, the machine-independent optimization module may sort the unvisited nodes in reverse postorder. In an aspect, the machine-independent optimization module may order the unvisited nodes in a postordering and then may reverse the postordering. The machine-independent optimization module may also select the first node in the reverse postordering in block 1226. The machine-independent optimization module may also add the selected node to the ready list in block 1228.

The machine-independent optimization module may continue with the operations in method 700 by selecting another node in the ready list in block 708 as described above with reference to FIG. 7.

Figure 13:
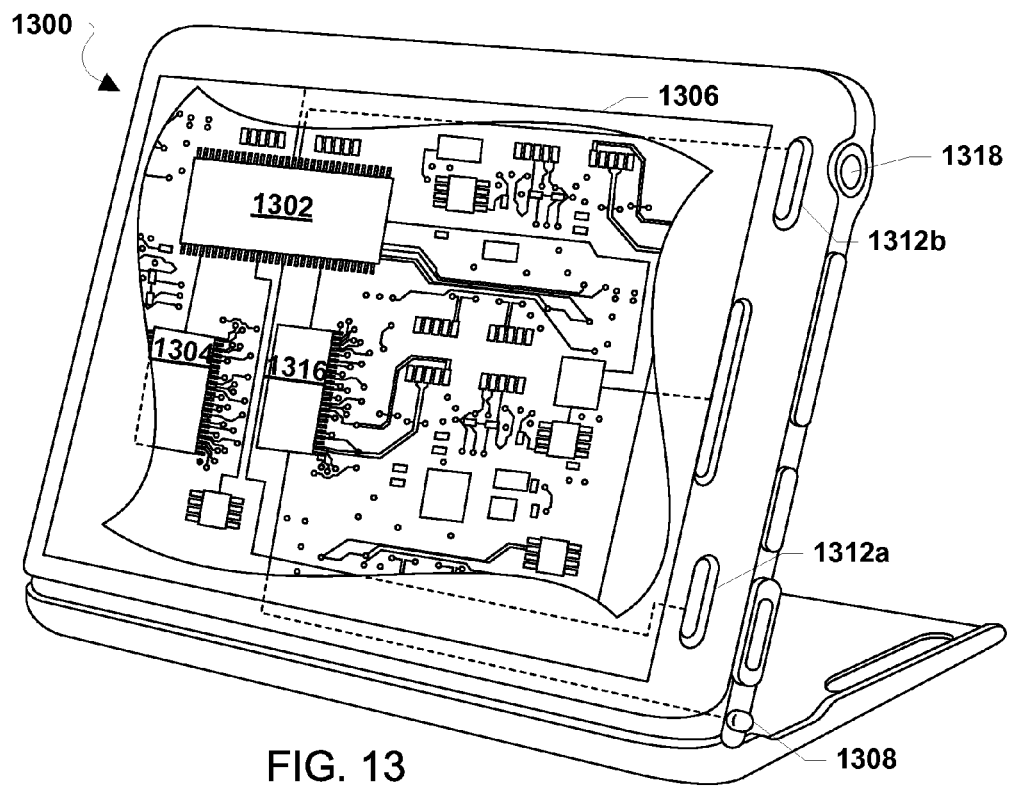
FIG. 13 is a block diagram of an example computing device according to an aspect.

The various aspects may be implemented in any of a variety of computing devices, an example of which is illustrated in FIG. 13. For example, the computing device 1300 may include a processor 1302 coupled to internal memory 1304. Internal memory 1304 may be volatile or non-volatile memory, and may also be secure and/or encrypted memory, or unsecure and/or unencrypted memory, or any combination thereof. The processor 1302 may also be coupled to a touch screen display 1306, such as a resistive-sensing touch screen, capacitive-sensing touch screen infrared sensing touch screen, or the like. Additionally, the display of the computing device 1300 need not have touch screen capability. Additionally, the computing device 1300 may have one or more antenna 1308 for sending and receiving electromagnetic radiation that may be connected to a wireless data link and/or cellular telephone transceiver 1316 coupled to the processor 1302. The computing device 1300 may also include physical buttons 1312*a* and 1312*b* for receiving user inputs. The computing device 1300 may also include a power button 1318 for turning the computing device 1300 on and off.

Figure 14:
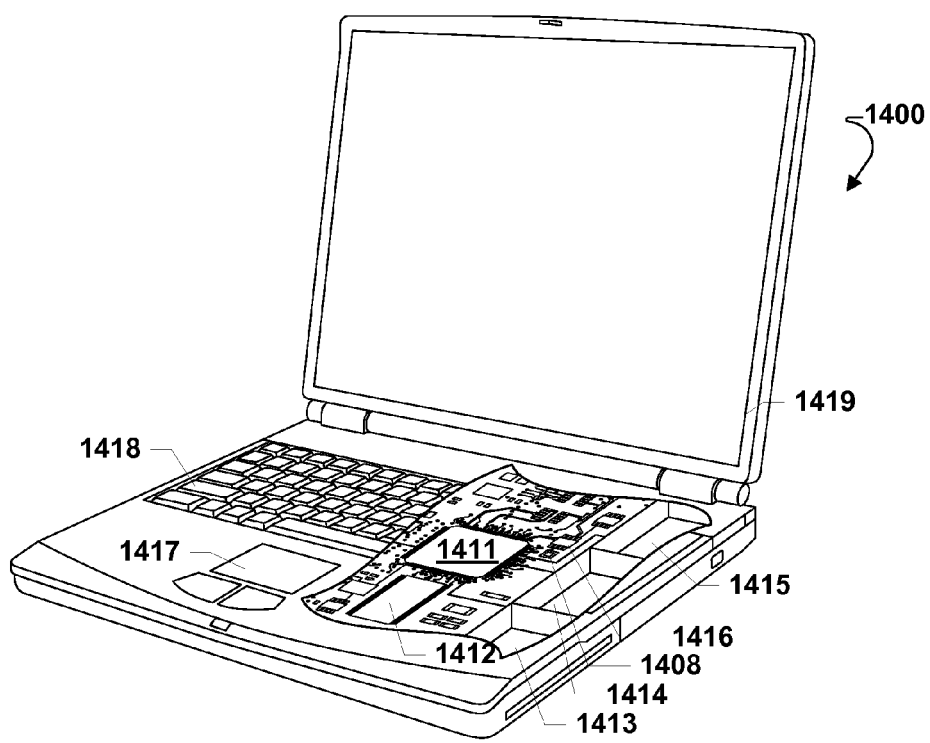
FIG. 14 is a block diagram of another example computing device according to an aspect.

The various aspects described above may also be implemented within a variety of computing devices, such as a laptop computer 1400 illustrated in FIG. 14. Many laptop computers include a touchpad touch surface 1417 that serves as the computer's pointing device, and thus may receive drag, scroll, and flick gestures similar to those implemented on mobile computing devices equipped with a touch screen display and described above. A laptop computer 1400 will typically include a processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1416 coupled to the processor 1411. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be use in conjunction with the various aspects.

In the foregoing descriptions of the various embodiments the terms "optimize," "optimizing" and "optimization" are used to refer to processing of source code that will improve its overall implementation compared to its original presentation, and are not intended to communicate, infer or be construed as meaning that the processing results in a theoretically optimum representation. To the contrary, the various embodiments result in improved, though not optimal representations of source code using processes that are more efficient than the conventional recursive forward and backward methods that can result in an optimal intermediate representation of the source code, The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of optimizing an intermediate representation of source code, comprising:
   generating a graph from the intermediate representation, wherein the graph comprises a plurality of nodes;
   initializing a ready list;
   adding a start node in the plurality of nodes to the ready list;
   selecting a node in the ready list;
   incrementing a visitation counter of the selected node;
   determining whether the selected node has been visited more than twice;
   determining whether to apply a forwards optimization on the selected node in response to determining that the selected node has not been visited more than twice;
   applying the forwards optimization on the selected node in response to determining to apply the forwards optimization on the selected node;
   recognizing a bounded subgraph based on the selected node;
   initializing a successor list;
   adding all successors of the selected node in the bounded subgraph to the successor list;
   choosing a successor node from the successor list;
   incrementing a visitation counter of the chosen successor node;
   determining whether the chosen successor node has been visited more than twice;
   determining whether to apply the forwards optimization on the chosen successor node in response to determining that the chosen successor node has not been visited twice;
   applying the forwards optimization on the chosen successor node in response to determining to apply the forwards optimization;
   determining whether the chosen successor node is an exit node;
   adding successors of the chosen successor node to the successor list unless it is determined that the chosen successor node is an exit node or it is determined not to apply the forwards optimization on the chosen successor node; and removing the chosen successor node from the successor list.

2. The method of claim 1, wherein recognizing a bounded subgraph based on the selected node comprises:
identifying an entry node, wherein the entry node is a predecessor node of the selected node;
scanning through the graph;
determining whether the exit node is detected, wherein the exit node is a successor node of the selected node; and
defining the bounded subgraph based on the entry node and the exit node in response to determining that the exit node is detected.

3. The method of claim 1, wherein selecting a node in the ready list comprises:
determining whether there is a control flow node in the ready list;
selecting the control flow node in response to determining that a control flow node is in the ready list; and
selecting a data node in response to determining that there are no control flow nodes in the ready list.

4. The method of claim 1, wherein selecting a node in the ready list comprises:
sorting nodes in the ready list into a reverse postordering; and
selecting a first node in the reverse postordering.

5. The method of claim 1, further comprising:
adding successors of the selected node to the ready list; and
removing the selected node from the ready list.

6. The method of claim 5, wherein adding successors of the selected node to the ready list comprises:
for each of the selected node's successors, determining whether predecessors of a successor node have all been visited; and
adding the successor node to the ready list in response to determining that the successor node's predecessors have all been visited.

7. The method of claim 1, further comprising:
determining whether to apply a backwards optimization on the selected node in response to determining that the selected node has not been visited more than twice; and
applying the backwards optimization on the selected node in response to determining to apply the backwards optimization.

8. The method of claim 7, further comprising:
propagating the backwards optimization through the bounded subgraph of the selected node in response to determining to apply the backwards optimization on the selected node.

9. The method of claim 1, further comprising:
determining whether the successor list is empty; and
selecting another successor node in the successor list in response to determining that the successor list is not empty.

10. The method of claim 8, wherein propagating the backwards optimization through the bounded subgraph of the selected node comprises:
initializing a predecessor list;
adding all predecessors of the selected node to the predecessor list;
choosing a predecessor node from the predecessor list;
incrementing a visitation counter of the chosen predecessor node;
determining whether the chosen predecessor node has been visited more than twice;
determining whether to apply the backwards optimization on the chosen predecessor node in response to determining that the chosen predecessor node has not been visited twice;
applying the backwards optimization on the chosen predecessor node in response to determining to apply the backwards optimization;
determining whether the chosen predecessor node is an entry node;
adding a predecessor of the chosen predecessor node to the predecessor list unless it is determined that the chosen predecessor node is an entry node or it is determined not to apply the backwards optimization on the chosen predecessor node; and
removing the chosen predecessor node from the predecessor list.

11. The method of claim 10, further comprising:
determining whether the predecessor list is empty; and
selecting another predecessor node in the predecessor list in response to determining that the predecessor list is not empty.

12. The method of claim 1, further comprising:
determining whether the ready list is empty; and
selecting another node in the ready list for optimization in response to determining that the ready list is not empty.

13. The method of claim 12, further comprising:
determining whether all nodes in the graph have been visited in response to determining that the ready list is empty; and
adding an unvisited node to the ready list in response to determining that all nodes in the graph have not been visited.

14. The method of claim 13, wherein adding an unvisited node to the ready list comprises:
scanning the graph for unvisited nodes;
determining whether a phi node in the graph has not been visited;
selecting the phi node in response to determining that the phi node has not been visited;
selecting another unvisited node in response to determining that there are no unvisited phi nodes; and
adding the selected node to the ready list.

15. The method of claim 13, wherein adding an unvisited node to the ready list comprises:
scanning the graph for unvisited nodes;
sorting the unvisited nodes into a reverse postordering;
selecting a first node in the reverse postordering; and
adding the selected node to the ready list.

16. A computing device, comprising:
a memory; and
a processor coupled to the memory, wherein the processor is configured with processor-executable instructions to perform operations comprising:
generating a graph from an intermediate representation of source code, wherein the graph comprises a plurality of nodes;
initializing a ready list;
adding a start node to the ready list;
selecting a node in the ready list;
incrementing a visitation counter of the selected node;
determining whether the selected node has been visited more than twice;
determining whether to apply a forwards optimization on the selected node in response to determining that the selected node has not been visited more than twice;

applying the forwards optimization on the selected node in response to determining to apply the forwards optimization on the selected node;
recognizing a bounded subgraph based on the selected node;
initializing a successor list;
adding all successors of the selected node in the bounded subgraph to the successor list;
choosing a successor node from the successor list;
incrementing a visitation counter of the chosen successor node;
determining whether the chosen successor node has been visited more than twice;
determining whether to apply the forwards optimization on the chosen successor node in response to determining that the chosen successor node has not been visited twice;
applying the forwards optimization on the chosen successor node in response to determining to apply the forwards optimization;
determining whether the chosen successor node is an exit node;
adding successors of the chosen successor node to the successor list unless it is determined that the chosen successor node is an exit node or it is determined not to apply the forwards optimization on the chosen successor node; and
removing the chosen successor node from the successor list.

17. The computing device of claim 16, wherein the processor is configured with processor-executable instructions to perform operations such that recognizing a bounded subgraph based on the selected node comprises:
identifying an entry node, wherein the entry node is a predecessor node of the selected node;
scanning through the graph;
determining whether the exit node is detected, wherein the exit node is a successor node of the selected node; and
defining the bounded subgraph based on the entry node and the exit node in response to determining that the exit node is detected.

18. The computing device of claim 16, wherein the processor is configured with processor-executable instructions to perform operations such that selecting a node in the ready list comprises:
determining whether there is a control flow node in the ready list;
selecting the control flow node in response to determining that a control flow node is in the ready list; and
selecting a data node in response to determining that there are no control flow nodes in the ready list.

19. The computing device of claim 16, wherein the processor is configured with processor-executable instructions to perform operations such that selecting a node in the ready list comprises:
sorting nodes in the ready list into a reverse postordering; and
selecting a first node in the reverse postordering.

20. The computing device of claim 16, wherein the processor is configured with processor-executable instructions to perform operations further comprising:
adding successors of the selected node to the ready list; and
removing the selected node from the ready list.

21. The computing device of claim 20, wherein the processor is configured with processor-executable instructions to perform operations such that adding successors of the selected node to the ready list comprises:
for each of the selected node's successors, determining whether predecessors of a successor node have all been visited; and
adding the successor node to the ready list in response to determining that the successor node's predecessors have all been visited.

22. The computing device of claim 16, wherein the processor is configured with processor-executable instructions to perform operations further comprising:
determining whether to apply a backwards optimization on the selected node in response to determining that the selected node has not been visited more than twice; and
applying the backwards optimization on the selected node in response to determining to apply the backwards optimization.

23. The computing device of claim 22, wherein the processor is configured with processor-executable instructions to perform operations further comprising:
propagating the backwards optimization through the bounded subgraph of the selected node in response to determining to apply the backwards optimization on the selected node.

24. The computing device of claim 16, wherein the processor is configured with processor-executable instructions to perform operations further comprising:
determining whether the successor list is empty; and
selecting another successor node in the successor list in response to determining that the successor list is not empty.

25. The computing device of claim 23, wherein the processor is configured with processor-executable instructions to perform operations such that propagating the backwards optimization through the bounded subgraph of the selected node comprises:
initializing a predecessor list;
adding all predecessors of the selected node to the predecessor list;
choosing a predecessor node from the predecessor list;
incrementing a visitation counter of the chosen predecessor node;
determining whether the chosen predecessor node has been visited more than twice;
determining whether to apply the backwards optimization on the chosen predecessor node in response to determining that the chosen predecessor node has not been visited twice;
applying the backwards optimization on the chosen predecessor node in response to determining to apply the backwards optimization;
determining whether the chosen predecessor node is an entry node;
adding a predecessor of the chosen predecessor node to the predecessor list unless it is determined that the chosen predecessor node is an entry node or it is determined not to apply the backwards optimization on the chosen predecessor node; and
removing the chosen predecessor node from the predecessor list.

26. The computing device of claim 25, wherein the processor is configured with processor-executable instructions to perform operations further comprising:
determining whether the predecessor list is empty; and
selecting another predecessor node in the predecessor list in response to determining that the predecessor list is not empty.

27. The computing device of claim 16, wherein the processor is configured with processor-executable instructions to perform operations further comprising:
  determining whether the ready list is empty; and
  selecting another node in the ready list for optimization in response to determining that the ready list is not empty.

28. The computing device of claim 27, wherein the processor is configured with processor-executable instructions to perform operations further comprising:
  determining whether all nodes in the graph have been visited in response to determining that the ready list is empty; and
  adding an unvisited node to the ready list in response to determining that all nodes in the graph have not been visited.

29. The computing device of claim 28, wherein the processor is configured with processor-executable instructions to perform operations such that adding an unvisited node to the ready list comprises:
  scanning the graph for unvisited nodes;
  determining whether a phi node in the graph has not been visited;
  selecting the phi node in response to determining that the phi node has not been visited;
  selecting another unvisited node in response to determining that there are no unvisited phi nodes; and
  adding the selected node to the ready list.

30. The computing device of claim 28, wherein the processor is configured with processor-executable instructions to perform operations such that adding an unvisited node to the ready list comprises:
  scanning the graph for unvisited nodes;
  sorting the unvisited nodes into a reverse postordering;
  selecting a first node in the reverse postordering; and
  adding the selected node to the ready list.

31. A computing device, comprising:
  means for generating a graph from an intermediate representation of source code, wherein the graph comprises a plurality of nodes;
  means for initializing a ready list;
  means for adding a start node to the ready list;
  means for selecting a node in the ready list;
  means for incrementing a visitation counter of the selected node;
  means for determining whether the selected node has been visited more than twice;
  means for determining whether to apply a forwards optimization on the selected node in response to determining that the selected node has not been visited more than twice;
  means for applying the forwards optimization on the selected node in response to determining to apply the forwards optimization on the selected node;
  means for recognizing a bounded subgraph based on the selected node;
  means for initializing a successor list;
  means for adding all successors of the selected node in the bounded subgraph to the successor list;
  means for choosing a successor node from the successor list;
  means for incrementing a visitation counter of the chosen successor node;
  means for determining whether the chosen successor node has been visited more than twice;
  means for determining whether to apply the forwards optimization on the chosen successor node in response to determining that the chosen successor node has not been visited twice;
  means for applying the forwards optimization on the chosen successor node in response to determining to apply the forwards optimization;
  means for determining whether the chosen successor node is an exit node;
  means for adding successors of the chosen successor node to the successor list unless it is determined that the chosen successor node is an exit node or it is determined not to apply the forwards optimization on the chosen successor node; and
  means for removing the chosen successor node from the successor list.

32. The computing device of claim 31, wherein means for recognizing a bounded subgraph based on the selected node comprises:
  means for identifying an entry node, wherein the entry node is a predecessor node of the selected node;
  means for scanning through the graph;
  means for determining whether the exit node is detected, wherein the exit node is a successor node of the selected node; and
  means for defining the bounded subgraph based on the entry node and the exit node in response to determining that the exit node is detected.

33. The computing device of claim 31, wherein means for selecting a node in the ready list comprises:
  means for determining whether there is a control flow node in the ready list;
  means for selecting the control flow node in response to determining that a control flow node is in the ready list; and
  means for selecting a data node in response to determining that there are no control flow nodes in the ready list.

34. The computing device of claim 31, wherein means for selecting a node in the ready list comprises:
  means for sorting nodes in the ready list into a reverse postordering; and
  means for selecting a first node in the reverse postordering.

35. The computing device of claim 31, further comprising:
  means for adding successors of the selected node to the ready list; and
  means for removing the selected node from the ready list.

36. The computing device of claim 35, wherein means for adding successors of the selected node to the ready list comprises:
  means for determining for each of the selected node's successors whether predecessors of a successor node have all been visited; and
  means for adding the successor node to the ready list in response to determining that the successor node's predecessors have all been visited.

37. The computing device of claim 31, further comprising:
  means for determining whether to apply a backwards optimization on the selected node in response to determining that the selected node has not been visited more than twice; and
  means for applying the backwards optimization on the selected node in response to determining to apply the backwards optimization.

38. The computing device of claim 37, further comprising:
  means for propagating the backwards optimization through the bounded subgraph of the selected node in response to determining to apply the backwards optimization on the selected node.

39. The computing device of claim 31, further comprising:
means for determining whether the successor list is empty; and
means for selecting another successor node in the successor list in response to determining that the successor list is not empty.

40. The computing device of claim 38, wherein means for propagating the backwards optimization through the bounded subgraph of the selected node comprises:
means for initializing a predecessor list;
means for adding all predecessors of the selected node to the predecessor list;
means for choosing a predecessor node from the predecessor list;
means for incrementing a visitation counter of the chosen predecessor node;
means for determining whether the chosen predecessor node has been visited more than twice;
means for determining whether to apply the backwards optimization on the chosen predecessor node in response to determining that the chosen predecessor node has not been visited twice;
means for applying the backwards optimization on the chosen predecessor node in response to determining to apply the backwards optimization;
means for determining whether the chosen predecessor node is an entry node;
means for adding a predecessor of the chosen predecessor node to the predecessor list unless it is determined that the chosen predecessor node is an entry node or it is determined not to apply the backwards optimization on the chosen predecessor node; and
means for removing the chosen predecessor node from the predecessor list.

41. The computing device of claim 40, further comprising:
means for determining whether the predecessor list is empty; and
means for selecting another predecessor node in the predecessor list in response to determining that the predecessor list is not empty.

42. The computing device of claim 31, further comprising:
means for determining whether the ready list is empty; and
means for selecting another node in the ready list for optimization in response to determining that the ready list is not empty.

43. The computing device of claim 42, further comprising:
means for determining whether all nodes in the graph have been visited in response to determining that the ready list is empty; and
means for adding an unvisited node to the ready list in response to determining that all nodes in the graph have not been visited.

44. The computing device of claim 43, wherein means for adding an unvisited node to the ready list comprises:
means for scanning the graph for unvisited nodes;
means for determining whether a phi node in the graph has not been visited;
means for selecting the phi node in response to determining that the phi node has not been visited;
means for selecting another unvisited node in response to determining that there are no unvisited phi nodes; and
means for adding the selected node to the ready list.

45. The computing device of claim 43, wherein means for adding an unvisited node to the ready list comprises:
means for scanning the graph for unvisited nodes;
means for sorting the unvisited nodes into a reverse postordering;
means for selecting a first node in the reverse postordering; and
means for adding the selected node to the ready list.

46. A non-transitory processor-readable storage medium having stored thereon processor-executable software instructions configured to cause a processor of a computing device to perform operations for optimizing an intermediate representation of source code, the operations comprising:
generating a graph from the intermediate representation, wherein the graph comprises a plurality of nodes;
initializing a ready list;
adding a start node to the ready list;
selecting a node in the ready list;
incrementing a visitation counter of the selected node;
determining whether the selected node has been visited more than twice;
determining whether to apply a forwards optimization on the selected node in response to determining that the selected node has not been visited more than twice;
applying the forwards optimization on the selected node in response to determining to apply the forwards optimization on the selected node;
recognizing a bounded subgraph based on the selected node;
initializing a successor list;
adding all successors of the selected node in the bounded subgraph to the successor list;
choosing a successor node from the successor list;
incrementing a visitation counter of the chosen successor node;
determining whether the chosen successor node has been visited more than twice;
determining whether to apply the forwards optimization on the chosen successor node in response to determining that the chosen successor node has not been visited twice;
applying the forwards optimization on the chosen successor node in response to determining to apply the forwards optimization;
determining whether the chosen successor node is an exit node;
adding successors of the chosen successor node to the successor list unless it is determined that the chosen successor node is an exit node or it is determined not to apply the forwards optimization on the chosen successor node; and
removing the chosen successor node from the successor list.

47. The non-transitory processor-readable storage medium of claim 46, wherein the stored processor-executable software instructions are configured to cause a processor of a computing device to perform operations such that recognizing a bounded subgraph based on the selected node comprises:
identifying an entry node, wherein the entry node is a predecessor node of the selected node;
scanning through the graph;
determining whether the exit node is detected, wherein the exit node is a successor node of the selected node; and
defining the bounded subgraph based on the entry node and the exit node in response to determining that the exit node is detected.

48. The non-transitory processor-readable storage medium of claim 46, wherein the stored processor-executable software instructions are configured to cause a processor of a computing device to perform operations such that selecting a node in the ready list comprises:
  determining whether there is a control flow node in the ready list;
  selecting the control flow node in response to determining that a control flow node is in the ready list; and
  selecting a data node in response to determining that there are no control flow nodes in the ready list.

49. The non-transitory processor-readable storage medium of claim 46, wherein the stored processor-executable software instructions are configured to cause a processor of a computing device to perform operations such that selecting a node in the ready list comprises:
  sorting nodes in the ready list into a reverse postordering; and
  selecting a first node in the reverse postordering.

50. The non-transitory processor-readable storage medium of claim 46, wherein the stored processor-executable software instructions are configured to cause a processor of a computing device to perform operations further comprising:
  adding successors of the selected node to the ready list; and
  removing the selected node from the ready list.

51. The non-transitory processor-readable storage medium of claim 50, wherein the stored processor-executable software instructions are configured to cause a processor of a computing device to perform operations such that adding successors of the selected node to the ready list comprises:
  for each of the selected node's successors, determining whether predecessors of a successor node have all been visited; and
  adding the successor node to the ready list in response to determining that the successor node's predecessors have all been visited.

52. The non-transitory processor-readable storage medium of claim 46, wherein the stored processor-executable software instructions are configured to cause a processor of a computing device to perform operations further comprising:
  determining whether to apply a backwards optimization on the selected node in response to determining that the selected node has not been visited more than twice; and
  applying the backwards optimization on the selected node in response to determining to apply the backwards optimization.

53. The non-transitory processor-readable storage medium of claim 52, wherein the stored processor-executable software instructions are configured to cause a processor of a computing device to perform operations further comprising:
  propagating the backwards optimization through the bounded subgraph of the selected node in response to determining to apply the backwards optimization on the selected node.

54. The non-transitory processor-readable storage medium of claim 46, wherein the stored processor-executable software instructions are configured to cause a processor of a computing device to perform operations further comprising:
  determining whether the successor list is empty; and
  selecting another successor node in the successor list in response to determining that the successor list is not empty.

55. The non-transitory processor-readable storage medium of claim 53, wherein the stored processor-executable software instructions are configured to cause a processor of a computing device to perform operations such that propagating the backwards optimization through the bounded subgraph of the selected node comprises:
  initializing a predecessor list;
  adding all predecessors of the selected node to the predecessor list;
  choosing a predecessor node from the predecessor list;
  incrementing a visitation counter of the chosen predecessor node;
  determining whether the chosen predecessor node has been visited more than twice;
  determining whether to apply the backwards optimization on the chosen predecessor node in response to determining that the chosen predecessor node has not been visited twice;
  applying the backwards optimization on the chosen predecessor node in response to determining to apply the backwards optimization;
  determining whether the chosen predecessor node is an entry node;
  adding a predecessor of the chosen predecessor node to the predecessor list unless it is determined that the chosen predecessor node is an entry node or it is determined not to apply the backwards optimization on the chosen predecessor node; and
  removing the chosen predecessor node from the predecessor list.

56. The non-transitory processor-readable storage medium of claim 55, wherein the stored processor-executable software instructions are configured to cause a processor of a computing device to perform operations further comprising:
  determining whether the predecessor list is empty; and
  selecting another predecessor node in the predecessor list in response to determining that the predecessor list is not empty.

57. The non-transitory processor-readable storage medium of claim 46, wherein the stored processor-executable software instructions are configured to cause a processor of a computing device to perform operations further comprising:
  determining whether the ready list is empty; and
  selecting another node in the ready list for optimization in response to determining that the ready list is not empty.

58. The non-transitory processor-readable storage medium of claim 57, wherein the stored processor-executable software instructions are configured to cause a processor of a computing device to perform operations further comprising:
  determining whether all nodes in the graph have been visited in response to determining that the ready list is empty; and
  adding an unvisited node to the ready list in response to determining that all nodes in the graph have not been visited.

59. The non-transitory processor-readable storage medium of claim 58, wherein the stored processor-executable software instructions are configured to cause a processor of a computing device to perform operations such that adding an unvisited node to the ready list comprises:
  scanning the graph for unvisited nodes;
  determining whether a phi node in the graph has not been visited;
  selecting the phi node in response to determining that the phi node has not been visited;
  selecting another unvisited node in response to determining that there are no unvisited phi nodes; and
  adding the selected node to the ready list.

60. The non-transitory processor-readable storage medium of claim 58, wherein the stored processor-executable software instructions are configured to cause a processor of a computing device to perform operations such that adding an unvisited node to the ready list comprises:
  scanning the graph for unvisited nodes;
  sorting the unvisited nodes into a reverse postordering;
  selecting a first node in the reverse postordering; and
  adding the selected node to the ready list.

* * * * *